(12) United States Patent
Wu et al.

(10) Patent No.: US 11,461,777 B2
(45) Date of Patent: Oct. 4, 2022

(54) CROSS-LEDGER TRANSFERS BETWEEN DISTRIBUTED LEDGERS

(71) Applicant: TBCASOFT, INC., Sunnyvale, CA (US)

(72) Inventors: William Wu, Saratoga, CA (US); Chiahsin Li, San Jose, CA (US); Ling Wu, San Jose, CA (US)

(73) Assignee: TBCASOFT, INC.

( * ) Notice: Subject to any disclaimer, the term of this patent is extended or adjusted under 35 U.S.C. 154(b) by 194 days.

(21) Appl. No.: 15/866,266

(22) Filed: Jan. 9, 2018

(65) Prior Publication Data

US 2019/0188711 A1 Jun. 20, 2019

Related U.S. Application Data

(60) Provisional application No. 62/607,453, filed on Dec. 19, 2017.

(51) Int. Cl.
*G06Q 20/38* (2012.01)
*G06Q 20/40* (2012.01)
(Continued)

(52) U.S. Cl.
CPC ......... *G06Q 20/389* (2013.01); *G06Q 20/065* (2013.01); *G06Q 20/3678* (2013.01);
(Continued)

(58) Field of Classification Search
None
See application file for complete search history.

(56) References Cited

U.S. PATENT DOCUMENTS

| | | | |
|---|---|---|---|
| 9,807,106 B2 | 10/2017 | Daniel et al. | |
| 2013/0226891 A1* | 8/2013 | Markus | G06F 16/2329 707/703 |

(Continued)

OTHER PUBLICATIONS

PCT International Search Report and Written Opinion of the International Searching Authority for Application No. PCT/US2018/013861 dated May 15, 2018 (dated May 15, 2018) (11 sheets).
(Continued)

*Primary Examiner* — Neha Patel
*Assistant Examiner* — Nicholas K Phan
(74) *Attorney, Agent, or Firm* — Huan-Yi Lin

(57) ABSTRACT

The presently-disclosed solution provides cross-ledger transfers between distributed ledgers to achieve highly-scalable transaction throughput. Disclosed are methods and instruction code for writing a cross-ledger transfer in a way that effectively transfers value from a source distributed ledger to a target distributed ledger while preventing double spending of the value. This results in the transformation of the ledgers in that the total value in the source ledger is decreased by the transferred value while the total value in the target ledger is increased by the same amount. Also disclosed are system architectures that utilize cross-ledger transfers between multiple distributed ledgers to achieve highly-scalable transaction throughput. Also disclosed are computer apparatus configured to implement cross-ledger transfers between distributed ledgers. Other embodiments and features are also disclosed.

17 Claims, 23 Drawing Sheets

(51) Int. Cl.
  *G06Q 20/36* (2012.01)
  *G06Q 20/06* (2012.01)
  *H04L 67/1097* (2022.01)

(52) U.S. Cl.
  CPC ......... *G06Q 20/381* (2013.01); *G06Q 20/382* (2013.01); *G06Q 20/3827* (2013.01); *G06Q 20/401* (2013.01); *H04L 67/1097* (2013.01); *G06Q 2220/00* (2013.01)

(56) References Cited

U.S. PATENT DOCUMENTS

| | | | |
|---|---|---|---|
| 2016/0260169 | A1 | 9/2016 | Arnold et al. |
| 2016/0335641 | A1 | 11/2016 | White et al. |
| 2017/0221029 | A1 | 8/2017 | Lund et al. |
| 2017/0221052 | A1 | 8/2017 | Sheng et al. |
| 2017/0244720 | A1 | 8/2017 | Kurian et al. |
| 2017/0316391 | A1 | 11/2017 | Peikert et al. |
| 2017/0330174 | A1 | 11/2017 | Demarinis et al. |
| 2017/0352012 | A1 | 12/2017 | Hearn et al. |
| 2018/0025435 | A1 | 1/2018 | Karame et al. |
| 2018/0089041 | A1* | 3/2018 | Smith ............... G06F 11/1474 |
| 2018/0113752 | A1* | 4/2018 | Derbakova ............ G06Q 40/025 |
| 2018/0145836 | A1 | 5/2018 | Saur et al. |
| 2018/0174252 | A1* | 6/2018 | Senci .................. H04L 63/107 |
| 2018/0268152 | A1* | 9/2018 | Cuomo .............. G06F 16/2255 |
| 2019/0123895 | A1 | 4/2019 | Blake et al. |
| 2019/0156301 | A1* | 5/2019 | Bentov ............... G06Q 20/065 |
| 2019/0172026 | A1* | 6/2019 | Vessenes .............. H04L 9/3247 |
| 2019/0172057 | A1 | 6/2019 | Vincent |
| 2019/0190698 | A1* | 6/2019 | Nuzzi ..................... G06F 16/51 |
| 2019/0295083 | A1* | 9/2019 | Kud ...................... G06Q 20/388 |
| 2019/0356472 | A1* | 11/2019 | Allen .................. G06Q 20/065 |

OTHER PUBLICATIONS

"Office Action" dated Nov. 25, 2019 in U.S. Appl. No. 15/866,280, filed Jan. 9, 2018.
"Office Action" dated Jun. 10, 2020 in U.S. Appl. No. 15/866,280, filed Jan. 9, 2018.
"Office Action" dated Dec. 6, 2019 in U.S. Appl. No. 15/866,290, filed Jan. 9, 2018.
"Office Action" dated Jun. 11, 2020 in U.S. Appl. No. 15/866,290, filed Jan. 9, 2018.
"Office Action" dated Mar. 2, 2021 in U.S. Appl. No. 15/866,290, filed Jan. 9, 2018.
"Office Action" dated Mar. 2, 2021 in U.S. Appl. No. 15/866,280, filed Jan. 9, 2018.

* cited by examiner

801) The reference data in the transaction input is passed to the foreign node(s) inside a query 802) The foreign node(s) use the ledger identifier in the transaction input to find the correct block hash to block index to query.

803) The foreign node(s) use the block hash in the transaction input to find the correct block to examine.

804) The foreign node(s) extract the block header from the identified block.

805) The foreign node(s) extract the Merkle root hash from the identified block.

806) The foreign node(s) compute a transaction hash for the transaction in the transaction input.

807) The foreign node(s) compute a Merkle root hash from the transaction hash and the provided Merkle branch hashes.

808) The foreign node(s) compare the computed Merkle root hash with the Merkle root hash in the identified block.

809) The foreign node(s) return that the transaction is valid if the hashes match, invalid if they don't match.

(steps 10 and 15 in FIG. 7)

```
1   // When a source wants to send an asset to the target, which is in another distributed ledger (step 1 in FIG. 7)
2   NodeStack.InitiateCrossLedgerTransaction(Source, Asset, Target)
3       // Find the UTXO containing the asset to transfer (step 2 in FIG. 7)
4       UTXOToSpend = FindUTXOForAsset(Source, Asset)
5       // Construct the transaction (step 3 in FIG. 7)
6       InitiatingTransaction = MakeInitiatingTransactionForUTXO(UTXOToSpend)
7       // Index the transaction with metadata for later use
8       InitiatingTransactionIndex.Index(InitiatingTransaction, {Source, UTXOToSpend, Target})
9       // Sign the transaction with the private key of the source
10      Source.SignTransaction(InitiatingTransaction)
11      // Find the target node stack from the target
12      TargetNodeStack = GetNodeStack(Target)
13      // Send the transaction to the foreign node stack (step 4 in FIG. 7)
14      TargetNodeStack.CommitForeignTransaction(Source, InitiatingTransaction)
15      // Done
16  Exit
```

FIG. 9

```
1   // Called when a transaction is committed. Add UTXOs to pool.
2   NodeStack.NotifyCommitedTransaction(Transaction, SPVInfo (If foreign))
3       // Received an initiating transaction from a foreign node (step 7b in FIG. 7)
4       If IsInitiating(Transaction) and SPVInfo exists
5           // Find the UTXO that was selected for transfer from the index
6           UTXOToLock = InitiatingTransactionIndex.GetUTXOFor(Transaction)
7           // Build the locking transaction (step 8 in FIG. 7)
8           LockingTransaction = MakeLockingTransaction(UTXOToLock, Transaction, SPVInfo)
9           // Find the source of the initiating transaction
10          Source = InitiatingTransactionIndex.GetSourceFor(Transaction)
11          // Sign the locking transaction with the private key of the source
12          Source.SignTransaction(LockingTransaction)
13          // Submit the locking transaction to the local ledger (step 9 in FIG. 7)
14          DistributedLedger.Submit(Transaction)
15          // Done
16          Exit
17      // Received a locking transaction
18      If IsLocking(Transaction)
19          // Find the target from the indexed target for the initiating transaction within the locking transaction
20          Target = InitatingTransactionIndex.GetTargetFor(GetInitiatingTransaction(Transaction))
21          // Build the completing transaction (step 12b in FIG. 7)
22          CompletingTransaction=MakeCompletingTransaction(Transaction, DistributedLedger.GetSPVInfo(Transaction), Target)
23          // Find the source of the initiating transaction in the locking transaction from the index
24          Source = InitiatingTransactionIndex.GetSourceFor(GetInitiatingTransaction(Transaction))
25          // Sign the completing transaction with the private key of the source
26          Source.SignTransaction(CompletingTransaction)
27          // Find the target node stack from the target
28          TargetNodeStack = GetNodeStack(Target)
29          // Send the transaction to the foreign node stack (step 13 in FIG. 7)
30          TargetNodeStack.CommitForeignTransaction(Source, CompletingTransaction)
31          // Done
32          Exit
33      // Remove the TXOs spent and the TXOs created from this transaction from the set of UTXOs (step 18 in FIG. 7)
34      UpdateUTXOs(Transaction)
35      // Done
36      Exit
```

FIG. 10

1  // Called to commit a transaction on a foreign distributed ledger (steps 4 and 13 in FIG. 7)
2  NodeStack.CommitForeignTransaction(Source, Transaction)
3     // Adds the foreign transaction to an index so we can look up the foreign nodestack that submitted it
4     ForeignIndex.IndexForeignTransaction(Transaction,GetNodeStack(Source))
5     // Submits the transaction (steps 5 and 14 in FIG. 7)
6     DistributedLedger.Submit(Transaction)
7     // Done
8     Exit

FIG. 11

```
1     // Submits a transaction to the ledger (steps 5, 9 and 14 in FIG. 7)
2     DistributedLedger.Submit(Transaction)
3         // Make sure the transaction has a valid format
4         CheckFormat(Transaction)
5         ...
6         // Verify all inputs
7         For Transaction.Inputs
8             // Checks SPV references in committing and locking transactions
9             If ContainsSPVReference(Transaction.Input)
10                // If the input reference isn't in the SPV node (steps 10 and 15 in FIG. 7)
11                If SPVNode.CheckSPV(Transaction.Input) is false
12                    // Deny the transaction
13                    Reject Transaction
14                    // Done
15                    Exit
16                // Checks if locking transaction references TXO spent by this Transaction
17                If ContainsSPVReference(Transaction.Input.Transaction) (step 15 in FIG. 7)
18                    // Get the standard input from the transaction
19                    StandardInput = GetStandardInput(Transaction.Inputs)
20                    // If the initiating transaction inside the locking transaction is different
21                    // from the input of this transaction
22                    If StandardInput.Transaction.ID != Transaction.Input.Transaction.ID
23                        // Deny the transaction
24                        Reject Transaction
25                        // Done
26                        Exit
27         // Put the transaction in the mempool so it will be selected to commit in a following block
28         PrepareForCommit(Transaction)
29         // Done
30         Exit
```

FIG. 12

```
1   // Called after a consensus on a block is reached (steps 6, 11 and 16 in FIG. 7)
2   DistributedLedger.CommitBlock(Block)
3       // Persist the block
4       StoreBlock(Block)
5       // Send SPV info to SPV nodes (steps 7a and 12a in FIG. 7)
6       SPVNode.SendSPVInfo(Block.GetSPVInfo())
7       // Notify the node stack that a block was committed (steps 7b and 12b in FIG. 7)
8       NodeStack.NotifyBlockCommit(Block)
9       // Done
10      Exit
```

FIG. 13

```
1   // Indexes UTXOs in blocks that have been committed, and
2   // notifies foreign stacks when their transactions are committed (steps 7b, 12b and 17 in FIG. 7)
3   NodeStack.NotifyBlockCommit(Block)
4       // For every transaction in a block
5       For Block.Transactions
6           // If it's a foreign transaction
7           If ForeignIndex.HasTransaction(Block.Transaction)
8               // Find the foreign node stack and notify it
9               ForeignIndex.Get(Block.Transaction).NodeStack.NotifyCommittedTransaction(Block.Transaction, SPVInfo)
10          // Always notify local stack of a transaction commit
11          NotifyCommittedTransaction(Block.Transaction)
12      // Done
13  Exit
```

FIG. 14

Transaction 1500

List<TransactionInput> Inputs: List of transaction inputs
List<TransactionOutput> Outputs: List of transaction outputs

IntraLedger TransactionInput 1502

Bytes TransactionID: Hash of a Transaction
Int Offset: Offset of a TransactionOutput in the transaction identified by TransactionID

TransactionOutput 1506

Bytes DigitalProperty: Encoded digital property data
Bytes Lock: Encoded lock for the transaction output, unlocked by providing a signature from the matching private key.

CrossLedgerRef TransactionInput 1504

Bytes LedgerID: Unique identifier of a ledger
Bytes BlockHash: Hash of a Block
List<Bytes> MerkleBranchHashes: List of Hashes that when hashed together in a tree structure with the ID of the provided transaction, equal the MerkleHash in the Block identified by the BlockHash
Bytes TransactionBytes: The transaction that is committed in the co-chain
Int Offset: The offset of the transaction output that is being referenced within the given TransactionBytes

FIG. 15

Initiating Transaction 1600

List<TransactionInput> Inputs of Length 0
List<TransactionOutput> Outputs of Length 1

TransactionOutput 1606

Bytes DigitalProperty
Bytes Lock (Only spendable by Completing Transaction with SPV reference to a Locking Transaction with SPV reference to this transaction)

FIG. 16

CROSS-LEDGER TRANSFERS BETWEEN DISTRIBUTED LEDGERS

CROSS-REFERENCE TO RELATED APPLICATION(S)

The present application claims the benefit of U.S. Provisional Patent Application No. 62/607,453, filed Dec. 19, 2017, entitled "Blockchain Ecosystem Using Multiple Blockchains and Cross-Chain Transactions to Achieve Highly-Scalable Transaction Throughput," the disclosure of which is hereby incorporated by reference. The present application is related to U.S. patent application Ser. No. 15/866,280, filed on even date herewith, entitled "Systems of Multiple Distributed Ledgers Using Cross-Ledger Transfers for Highly-Scalable Transaction Throughput," the disclosure of which is hereby incorporated by reference. The present application is also related to U.S. patent application Ser. No. 15/866,290, filed on even date herewith, entitled "Computer Apparatus for Cross-Ledger Transfers Between Distributed Ledgers," the disclosure of which is hereby incorporated by reference.

BACKGROUND

1. Field of the Invention

The present disclosure relates generally to computer and network technology. More particularly, the present disclosure relates to blockchain and other distributed ledger technologies.

2. Description of the Background Art

A blockchain is a chain of block data structures (blocks) that is accessed and validated by a blockchain network. One example of a blockchain is known as the BITCOIN blockchain which functions as a distributed ledger of BITCOIN transactions, where BITCOIN is a specific cryptocurrency. Each block in the BITCOIN blockchain encodes multiple transactions of BITCOINs.

In the BITCOIN blockchain, each block includes a block header and a root of the Merkle tree of hash values for transactions included in the block. Each block is identified by a block hash (which is a hash value of the block header). The block header includes the root of the block's Merkle tree, the block hash of the previous block in the chain, and a nonce. A new block of transactions may be added to the BITCOIN blockchain by a miner in the BITCOIN network. Miners may access the blockchain and receive broadcasts of new transactions. A new block may be added to the blockchain when a miner validates the transactions in a prospective block and satisfies a challenge. A consensus protocol protects the consistency and integrity of the BITCOIN blockchain.

SUMMARY

The transaction throughput of conventional distributed ledger technologies has significant limitations and is not readily scalable. For example, the BITCOIN blockchain network has highly problematic throughput limitations due to latency and bandwidth issues, along with block size limits. It is highly desirable to solve the throughput scalability problem of distributed ledger technology.

The presently-disclosed solution provides cross-ledger transfers between distributed ledgers to achieve highly-scalable transaction throughput. Disclosed are methods and instruction code for writing a cross-ledger transfer in a way that effectively transfers value from a source to a target distributed ledger while preventing double spending of the value. Also disclosed are system architectures that utilize cross-ledger transfers between multiple distributed ledgers to achieve highly-scalable transaction throughput. Also disclosed are computer apparatus configured to implement cross-ledger transfers between distributed ledgers.

The cross-ledger transfer of the presently-disclosed solution results in the transformation or modification of the ledgers in that the total value in the source ledger is decreased by the transferred value while the total value in the target ledger is increased by the same amount. In an exemplary implementation, the extinction of the transferred value in the source ledger and the re-creation of the transferred value in the target ledger may be accomplished using a locking transaction in the source leder and initiating and completing transactions in the target ledger. The locking transaction references the initiating transaction, and the completing transaction references the locking transaction and spends a transaction output of the initiating transaction.

One embodiment of the presently-disclosed invention relates to a method of performing a cross-ledger transfer which transfers digitally-represented economic value from a source distributed ledger to a target distributed ledger in a way that prevents double spending of that value. An initiating transaction is written to the target distributed ledger, and a locking transaction is written to the source distributed ledger. The locking transaction spends a transaction output of an existing transaction in the source distributed ledger and references the initiating transaction in the target distributed ledger. A completing transaction may then be written to the target distributed ledger. The completing transaction spends the transaction output of the initiating transaction and references the locking transaction in the source distributed ledger.

Another embodiment relates to a non-transitory tangible medium with computer-readable code to perform a cross-ledger transfer. The cross-ledger transfer transfers digitally-represented economic value from a source distributed ledger to a target distributed ledger in a way that prevents double spending of that value.

Another embodiment relates to a first system architecture that uses cross-ledger transfers between distributed ledgers to achieve highly-scalable transaction throughput. The first system architecture includes a plurality of distributed ledger networks, each said distributed ledger network including a plurality of payment verification nodes for other distributed ledgers in the system.

Another embodiment relates to a second system architecture that uses cross-ledger transfers between distributed ledgers to achieve highly-scalable transaction throughput. The second system architecture includes a plurality of distributed ledger networks. The second system architecture further includes a set of shared nodes that are shared by the plurality of distributed ledger networks. Said shared nodes are provide, among other services, inter-ledger verification of transactions.

Another embodiment relates to a first computer apparatus for cross-ledger transfers between a plurality of distributed ledgers. The first computer apparatus includes computer-readable code for a local node-stack for a local distributed ledger of the plurality of distributed ledgers and computer-readable code for a foreign payment verification node-stack for a foreign distributed ledger of the plurality of distributed ledgers. The local node-stack is configured to use the foreign payment verification node-stack to verify transactions in the foreign distributed ledger during a cross-ledger transfer of a digitally-represented economic value between the local and foreign distributed ledgers.

Another embodiment relates to a second computer apparatus for cross-ledger transfers between a plurality of distributed ledgers. The second computer apparatus includes computer-readable code for node-stacks of the plurality of distributed ledgers. Each said node-stack is configured to perform a cross-ledger transfer of a digitally-represented economic value from a source distributed ledger to a target distributed ledger.

Other embodiments and features are also disclosed.

BRIEF DESCRIPTION OF THE DRAWINGS

FIG. 8 shows a process for inter-ledger transaction verification in accordance with an embodiment of the present invention.

FIG. 9 shows pseudocode for a procedure that may be performed to initiate a cross-ledger transaction from a source distributed ledger to a target distributed ledger in accordance with an embodiment of the present invention.

FIG. 10 shows pseudocode for a procedure that may be performed after an initiating or a locking transaction is committed in accordance with an embodiment of the present invention.

FIG. 11 shows pseudocode for a procedure that may be performed to commit a transaction on a foreign distributed ledger in accordance with an embodiment of the present invention.

FIG. 12 shows pseudocode for a procedure that may be performed to submit a transaction to a distributed ledger in accordance with an embodiment of the present invention.

FIG. 13 shows pseudocode for a procedure that may be performed by nodes of a distributed ledger after consensus on a block of transactions is reached in accordance with an embodiment of the present invention.

FIG. 14 shows pseudocode for a procedure that may be performed by nodes of a distributed ledger to index unspent transaction outputs in blocks that have been committed in accordance with an embodiment of the present invention.

FIG. 15 shows a general structure for a standard transaction which includes a cross-ledger referenced transaction input accordance with an embodiment of the present invention.

FIG. 16 shows a structure for an initiating transaction of a three-transaction cross-ledger transfer in accordance with an embodiment of the present invention.

The use of the same reference label in different drawings indicates the same or like components.

DETAILED DESCRIPTION

Introduction

Conventionally, institutions rely on a central clearing house to handle clearance and settlement of financial transactions. Such conventional clearance and settlement is problematic in that it is time consuming and expensive, particularly for international transactions.

In recent years, however, an alternative means for clearance and settlement has become available. This alternative generally uses a distributed ledger to clear and settle transactions in a cryptographic currency. A notable example of such a cryptographic currency is BITCOIN which is maintained by the BITCOIN blockchain network. Other examples of cryptographic currencies include LITECOIN, NOVACOIN, NAMECOIN, DOGECOIN, PEERCOIN, ETHEREUM, and RIPPLE.

Figure 1:
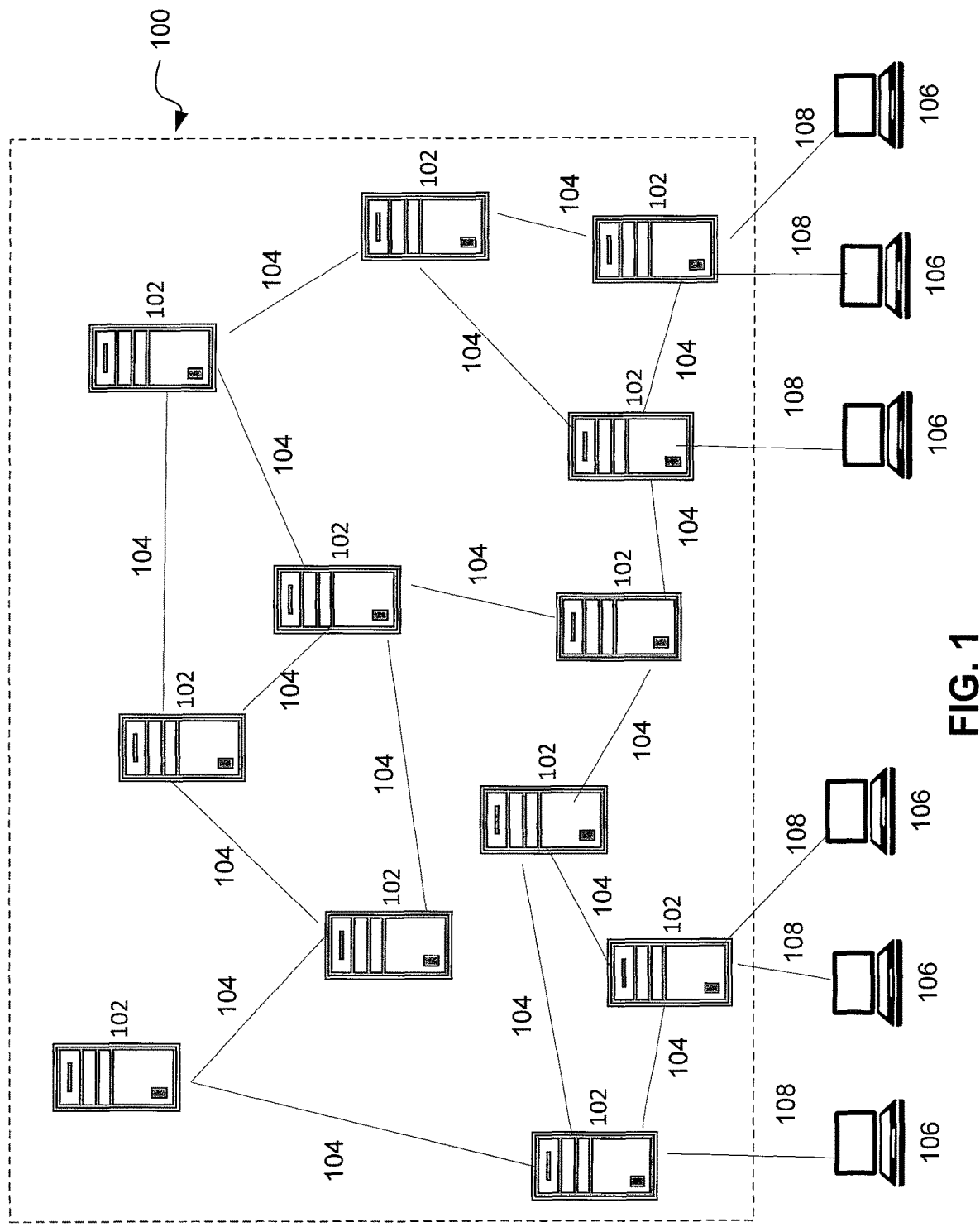
FIG. 1 is a diagram depicting the structure of a single distributed ledger network in accordance with an embodiment of the present invention.

FIG. 1 is a diagram depicting the structure of a single distributed ledger network 100 in accordance with an embodiment of the invention. The distributed ledger network 100 may be used to maintain a distributed ledger of transactions. One example of a distributed ledger is the BITCOIN blockchain. However, the distributed ledger network 100 may be generally any blockchain network or may be another type of distributed ledger network, such as one that uses a directed acyclic graph (DAG) algorithm to provide a DAG-based ledger. The presently-disclosed solution is generally applicable to (compatible with) a distributed ledger that is implemented using block of transactions, where each block header has a Merkle root of the transactions contained in the block.

The distributed ledger network 100 includes a plurality of nodes 102 with communicative connections 104 therebetween. For purpose of ease of illustration, only several nodes 102 are shown in the figure, but the distributed ledger network 100 may have a very large number of nodes with various interconnections 104 therebetween.

The nodes 102 generally each contain a complete and up-to-date copy of the data of the distributed ledger and so may be referred to as full nodes. In the example of the BITCOIN network, such full nodes may operate as miners of the BITCOIN blockchain, where successful miners are paid in the digital currency of BITCOIN. However, in accordance with an embodiment of the present invention, a distributed ledger may not need to pay successful miners in a digital currency and, furthermore, may deal more generally with digitally-represented assets (or liabilities) which need not be in a cryptocurrency.

A plurality of clients 106 may be communicatively connected to the digital ledger network 100. These clients 106 are lightweight nodes in that they do not maintain a complete and up-to-date copy of the distributed ledger, but they still have the capability to verify transactions in the distributed ledger.

For example, the clients 106 may be implemented as payment verification (PV) nodes which may verify transactions using a payment verification method. A PV node may be a non-full node that is connected to the distributed ledger network and holds the data required to prove the validity of a transaction in the distributed ledger. Individual transaction records are generally missing from the data at a PV node, so the PV node may be considered to be a client of a distributed ledger network. In an exemplary implementation, when the distributed ledger is a blockchain, the PV node may be a simplified payment verification (SPV) node, and the required data includes a Merkle root of the transactions in the block, the previous block hash, and a list of block signatures created by block validators.

The clients 106 may be considered to form part of an extended network beyond the core distributed ledger network. While only a few clients 106 are shown for ease of illustration, a multitude of clients 106 may be connected to the distributed ledger network 100.

As mentioned above, a famous example of a distributed ledger is a blockchain. A blockchain is maintained by a peer-to-peer (P2P) network of nodes running a P2P protocol to reach consensus serially on blocks of transactions. The presently-disclosed solution may be generally applied to blockchain technology or to other distributed ledger technologies.

A transaction in the distributed ledger may include a list of inputs and a list of outputs. A transaction hash may be constructed by hashing all of the data within a transaction. A transaction hash may be used to reference a transaction (i.e. as a transaction identifier or tx id).

A transaction output (TXO) may be identified by the hash of its transaction, its index within the transaction, and an identification of the recipient of the TXO. A TXO may hold any digitally-represented asset. TXOs are not transferred; the digitally-represented economic values within TXOs are transferred. The recipient may be identified by the hash of a public key of the recipient (who has the corresponding private key).

A transaction input references a TXO. For a conventional intra-ledger transaction, a transaction input references a TXO by the transaction hash and output index of the TXO. As taught by the present disclosure, the transaction input 210 for a cross-ledger transaction may be as described below in relation to FIG. 2.

Transaction Throughput Limitations

A conventional distributed ledger network, such as the BITCOIN network, has substantial transaction throughput limitations. These limitations are due to latency and bandwidth issues, along with limits to the block size.

Once a new block is created, it must be propagated throughout the distributed ledger network. However, there are substantial minimum latencies between authoritative network nodes (i.e. validator nodes) that are in different parts of the world. These latencies provide a lower limit to the speed of propagation and so limit the transaction throughput.

In addition, in order to increase transaction throughput, it may be possible to increase block size so as to fit in more transactions per block, and/or it may be possible to increase block frequency so as to process more blocks. However, bandwidth limitations within the distributed ledger network generally limits throughput gains achievable by such increases in block size and/or block frequency.

Multiple Distributed Ledger System with Cross-Ledger Transfers

The present disclosure provides an innovative solution to overcome the above-discussed transaction throughput limitations of a conventional distributed ledger technologies. Disclosed is technology that provides a multiple distributed ledger system with cross-ledger transfers. The cross-ledger transfers enable digitally-represented economic value to be transferred from one distributed ledger to another distributed ledger.

An example of digitally-represented economic value is a cryptocurrency, such as BITCOIN in the BITCOIN blockchain. More generally, the digitally-represented economic value transferred between source and target distributed ledgers may be any digitally-represented asset (such as conventional currency, cryptocurrency, a commodity, or other property) or liability (such as a debt). In one embodiment, the digitally-represented economic value may be in an amount of currency. In another embodiment, the digitally-represented economic value may be in an amount of cryptocurrency. In another embodiment, the digitally-represented economic value may be an amount of a commodity.

The cross-ledger transactions may be used to, in effect, link together the multiple distributed ledgers of the system. As such, the integrity of the transactions in each distributed ledger depends upon the integrity of the transactions in the other linked distributed ledger(s).

When multiple distributed ledgers are effectively linked together by cross-ledger transactions, the system of linked-together distributed ledger networks may be referred to as a multiple distributed ledger system or a distributed ledger "ecosystem". The distributed ledgers being maintained by the multiple distributed ledger system cooperate with each other and may be referred to as "co-ledgers".

While co-ledgers are each part of a same overall system, each co-ledger is a separate or "foreign" distributed ledger in relation to the other co-ledgers. Each co-ledger maintains its own ledger of transactions, and its ledger does not include transactions of the other co-ledgers. However, a transaction in one co-ledger may reference a transaction in a different co-ledger.

Advantageously, as disclosed herein, a multiple distributed ledger system having a scalable number of co-ledgers may be applied to overcome the above-discussed throughput limitations of a single distributed ledger network.

The latency limitation may be overcome because, when two validator nodes have a long latency between them, then they may be separated into distinct distributed ledger networks within the system. Since the two nodes validate different ledgers, the long latency between them will not affect the consensus time of either ledger. Hence, the presently-disclosed solution may be used to substantially reduce or eliminate the effect on performance of long latencies between nodes.

The bandwidth limitation may be overcome because the block size may be effectively reduced by using multiple co-ledgers, instead of a single distributed ledger. A structure with N co-ledgers may be used to effectively reduce the block size by a factor on the order of 1/N.

Thus, by dividing nodes into regions (or groups) such that cross-ledger transactions are relatively rare, the added throughput from adding a co-ledger will be a substantial fraction of the full throughput of just that chain running alone. This should result in an approximately linear throughput scaling with the number of co-ledgers.

Cross-Ledger Transaction Between Co-Ledgers

In accordance with an embodiment of the invention, a cross-ledger transaction between two distributed ledgers (i.e. two "co-ledgers") effectively extinguishes an existing unspent transaction output (UTXO) on the source distributed ledger 200S and creates one or more new UTXOs (with a total value equal to the extinguished UTXO) in the target distributed ledger 200T. Components of a cross-ledger transaction 205 that are written into the target distributed ledger 200T are depicted FIG. 2 in accordance with an embodiment of the invention.

Figure 2:
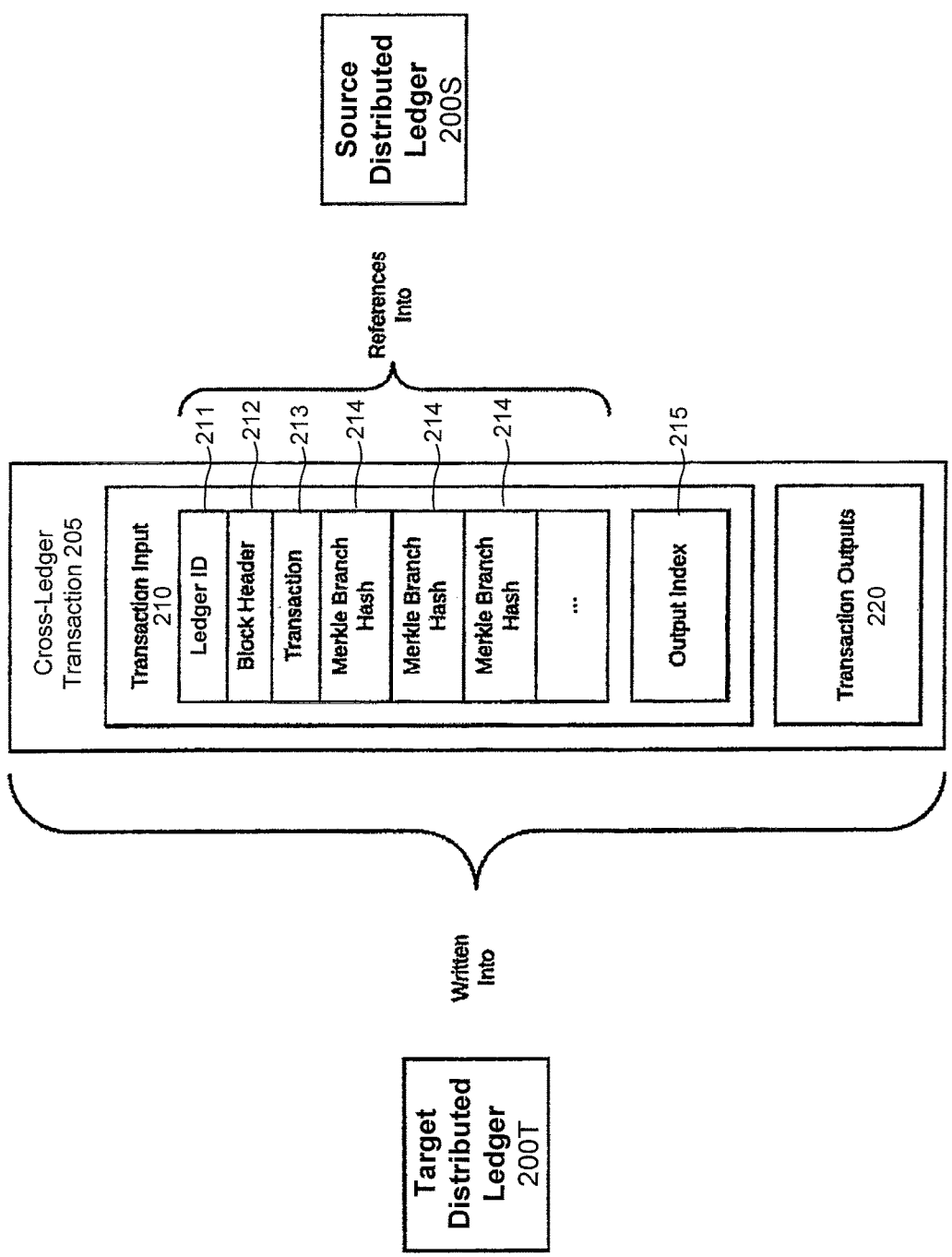
FIG. 2 is a diagram depicting data components of a single-transaction cross-ledger transfer of digitally-represented economic value between source and target distributed ledgers in accordance with an embodiment of the present invention.

As depicted in FIG. 2, the cross-ledger transaction 205 (which is to be written into the target distributed ledger 200T) comprises a transaction input 210, that provides references into the source distributed ledger 200S and a transaction output (or outputs) 220 which transfer value (or values) to a recipient (or recipients) in the target distributed ledger 200T.

More specifically, the transaction input 210 may include the chain identifier 211 of the source distributed ledger 200S, the block header 212 for the block for the existing transaction being referenced (including the Merkle branch hashes 214 for the Merkle tree of the block), the existing transaction being referenced 213, and the output index 215 which comprises a number that indicates the specific output of the existing transaction.

Note that the number of Merkle branch hashes 214 required is greater than, or equal to, a base 2 logarithm of the number of transactions in the block. Hence, if there are 1000 (one thousand) transactions in the block, then 10 (ten) Merkle branch hashes are required.

Note also that the transaction hash (which may be referred to as a transaction identifier or tx id) is a hash value derived from the referenced transaction 213 by applying a hash function to the contents of the referenced transaction. The transaction hash may be hashed with the Merkle branch hashes to form a Merkle root. This Merkle root may be matched against the Merkle root of the block within the source distributed ledger 200S to prove the transaction 213 exists in the source distributed ledger 200S.

The transaction output or outputs 220 provide the data for the spending of the that was obtained from the UTXO in the source distributed ledger 200S (as specified by the transaction 213 and the output index 215). Each transaction output 220 provides a digitally-represented economic value which has been transferred to a recipient and a hash of the public key of the recipient.

Figure 3:
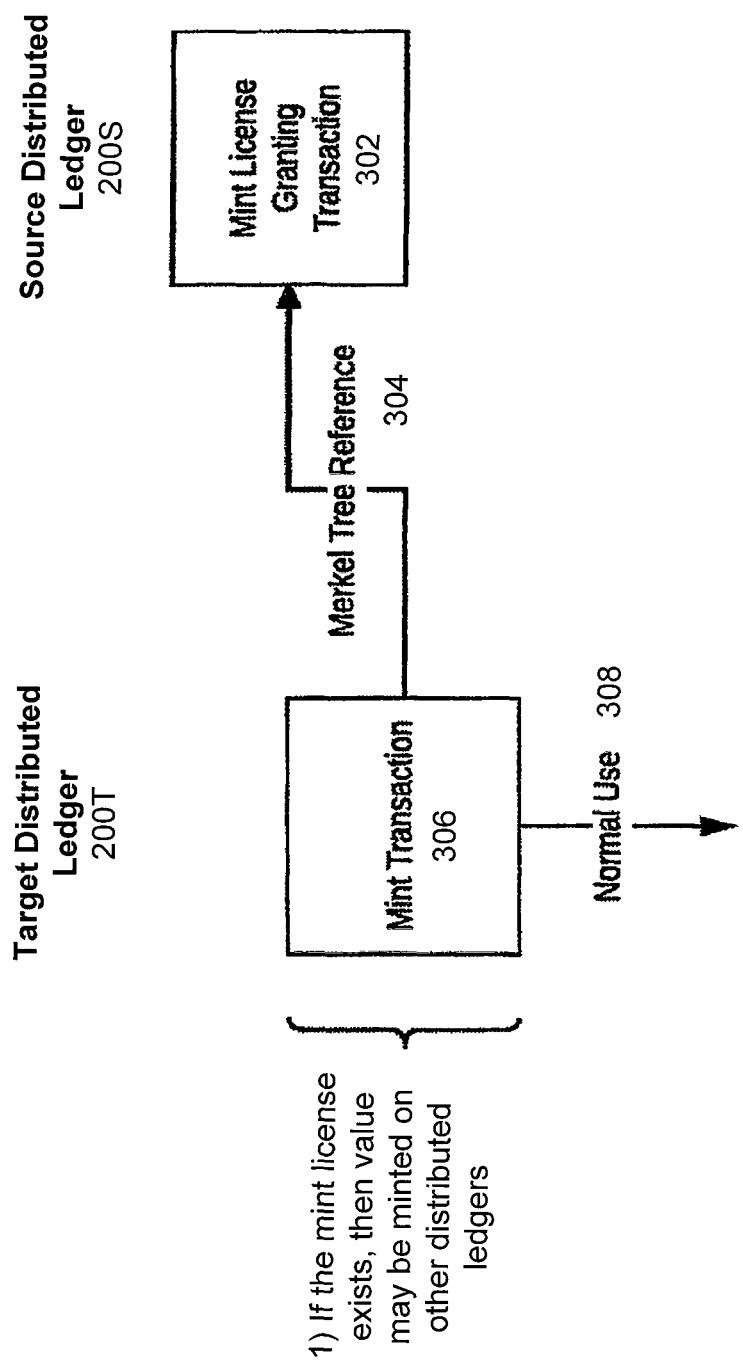
FIG. 3 is a diagram depicting a two-transaction cross-ledger transfer which involves a mint transaction in a target distributed ledger which references a mint license granting transaction in a source distributed ledger in accordance with an embodiment of the present invention.

Two-Transaction Cross-Ledger Transfer Which Prevents Spending in the Source Distributed Ledger To understand the mechanism of operation of the disclosed method for performing a cross-ledger transfer of digitally-represented economic value, consider minting through a referenced transaction as depicted in FIG. 3. In FIG. 3, the minting of digitally-represented economic value in a target distributed ledger (for example, a target blockchain) is performed through a referenced transaction in a source distributed ledger (for example, a source blockchain). However, as discussed below, such minting of digitally-represented economic value as depicted does not include a mechanism for preventing double (multiple) spending of the transferred value.

Consider that a transaction output (TXO) in a referenced transaction is guaranteed to have existed sometime in the past, but it is not guaranteed to still be unspent (at the current time or in the future). This means that referencing a TXO in the source chain is insufficient to support a cross-ledger transaction because only an unspent TXO (i.e. a UTXO) must be referenced.

In the cross-ledger transfer depicted in FIG. 3, the mint license granting transaction 302 in a source distributed ledger is a transaction that, by definition, will never be granted to another minter in the source distributed ledger. Hence, the TXO from the mint license granting transaction 302 is essentially unspendable in the source distributed ledger. In this case, using a Merkle proof 304 to prove the presence of the transaction granting the mint license in the source chain suffices to prove that the TXO is unspent (because it is unspendable) in the source distributed ledger.

As such, the fact that the mint license granting transaction exists in the source distributed ledger provides a basis for the mint transaction 306 to mint digitally-represented economic value in the target distributed ledger. Thereafter, the minted value may be used normally 308 for transactions in the target distributed ledger.

However, while the two-transaction cross-ledger transfer of FIG. 3 is safely avoids double spending when all entities using the system are trusted, it is insufficient to prevent double spending when untrusted entities may use the system. This is because the two-transaction cross-ledger transfer of FIG. 3 does not prevent the unspent TXO in the source distributed ledger from being spent in more than one target distributed ledger.

Three-Transaction Cross-Ledger Transfer Which Prevents Double Spending

Figure 4:
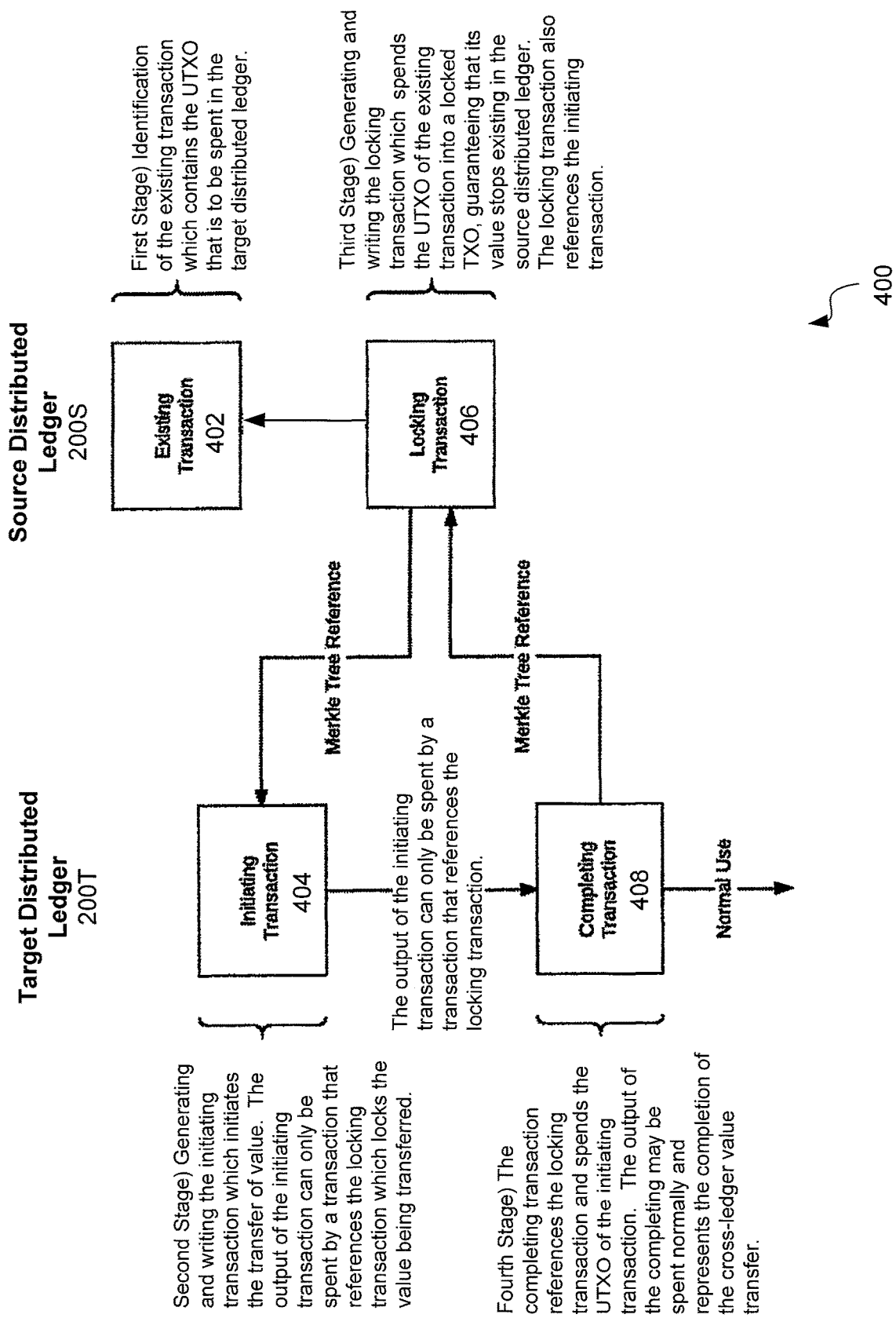
FIG. 4 is a diagram depicting a three-transaction cross-ledger transfer of digitally-represented economic value from a source distributed ledger to a target distributed ledger in accordance with an embodiment of the present invention.

In accordance with an embodiment of the invention, the method 400 depicted in FIG. 4 transfers digitally-represented economic value between co-ledgers. The cross-ledger transfer is performed in a way which guarantees, via a series of handshakes, that the value cannot be created out of nowhere by spending the unspent value in the source distributed ledger in more than one target distributed ledger.

As shown in FIG. 4, an exemplary implementation of such a cross-ledger transfer may generate and commit a series of three individual transactions to the distributed ledgers of the system. These transactions include an initiating transaction in the target distributed ledger; a locking transaction in the source distributed ledger; and a completing transaction in the target distributed ledger.

In a first stage of the method 400 which transfers digitally-represented economic value between co-ledgers, an unspent transaction output (UTXO) of an existing transaction 402 in the source distributed ledger 200S is found or identified. It is this UTXO in the source distributed ledger that is to be spent in the target distributed ledger 200T.

In a second stage of the method 400, an initiating transaction 404 is generated and committed to the target distributed ledger 200T. The initiating transaction 404 creates the same digitally-represented economic value as the identified UTXO of the existing transaction 402. However, in accordance with an embodiment of the invention, the initiating transaction 404 has a special property in that its output cannot be spent in a normal manner. (More particularly, as discussed below, the UTXO of the initiating transaction 404 can only be spent by a completing transaction 408 that references the locking transaction 406 which references the initiating transaction 404 and spends the identified UTXO of the existing transaction 402.)

In a third stage of the method 400, after the initiating transaction 404 is committed to the target distributed ledger 200T, a locking transaction 406 is generated and committed to the source distributed ledger 200S. The transaction input of the locking transaction 406 is the identified UTXO of the existing transaction 402 in the source distributed ledger 200S. As such, the locking transaction 406 spends the identified UTXO of the existing transaction 402 so that output becomes a spent TXO (and so no longer spendable) in the source distributed ledger 200S. However, by definition of the locking transaction, its output is unspendable (i.e. its output can never be spent). In effect, the locking transaction 406 locks the identified UTXO of the existing transaction 402 such that it is never spent in the source distributed ledger 200S.

Furthermore, the locking transaction 406 references the initiating transaction 404 in the target distributed ledger 200T (for example, by providing the entire initiating transaction and the Merkle root and branch hashes for verifying the existence of the initiating transaction in the target block). This "Merkle reference" from the locking transaction 406 to the initiating transaction 404 is used to prevent the value of the identified UTXO from being spent by more than once.

In a fourth stage of the method 400, after the locking transaction 406 is committed to the source distributed ledger 200S, a completing transaction 408 is generated and committed to the target distributed ledger 200T. A valid completing transaction 408 spends the UTXO created by the initiating transaction 404.

In order to be valid, the completing transaction 408 must reference the locking transaction 406 (for example, by providing the entire locking transaction and the Merkle root and branch hashes that may be used to verify the existence of the locking transaction in the source block) which spent the identified UTXO. Because the output of the locking transaction 406 cannot be spent, the existence of the locking transaction 406 in the source distributed ledger 200S provides a guarantee that the identified UTXO has been, in effect, extinguished in the source distributed ledger 200S.

More than one completing transaction 408 cannot be committed. This is because the completing transaction 408 is only valid if it spends (by way of its transaction input) the UTXO of the initiating transaction 404 which is referenced by the locking transaction 406. Hence, if the output being spent by the completing transaction 408 is not the output of the initiating transaction 404 referenced by the locking transaction 406, then the completing transaction 408 is invalid and so is prevented from being committed to the target distributed ledger 200T.

The transaction output or outputs (TXO or TXOs) of a valid completing transaction 408 represents the completion of the cross-ledger digitally-represented economic value transfer to one or more recipients in the target distributed ledger 200T. The TXO or TXOs of the completing transaction 408 may be spent normally within the target distributed ledger 200T by the recipient or recipients. In other words, once the completing transaction is committed to the target distributed ledger, the TXO(s) of the completing transaction may be spent within the target distributed ledger without needing to further reference any transaction in the source distributed ledger.

System Architectures

One system architecture that may be used to support cross-ledger transfers may have each full node of the source distributed ledger also be a full node of the target distributed ledger. Although such a full-overlapping system architecture would support cross-ledger transfers, it would require substantial extra resources at each node.

Disclosed herein are exemplary system architectures which support cross-ledger transfers while requiring less resources than a fully-overlapping system architecture. A first exemplary system architecture embeds foreign payment verification (PV) nodes into distributed ledger networks. A second exemplary system architecture utilizes a set of shared full nodes while not having every node be a shared node.

First Exemplary System Architecture: Co-Located
"Local" Full Nodes and "Foreign" PV Nodes In a first exemplary system architecture 500 depicted in FIG. 5A, payment verification (PV) nodes for other (i.e. foreign) co-ledgers are co-located at all, or a portion of, nodes in each distributed ledger network of the multiple distributed ledger system. The co-located PV nodes are used to support cross-ledger payment verification.

To reduce the resources needed to implement the system, the PV nodes may be non-full nodes. In an exemplary implementation, each PV node may implemented as a simplified payment verification (SPV) node. Furthermore, while a multiple distributed ledger system with four co-ledgers is depicted in FIG. 5A, a multiple distributed ledger system may include any number of co-ledgers.

Figure 5A:
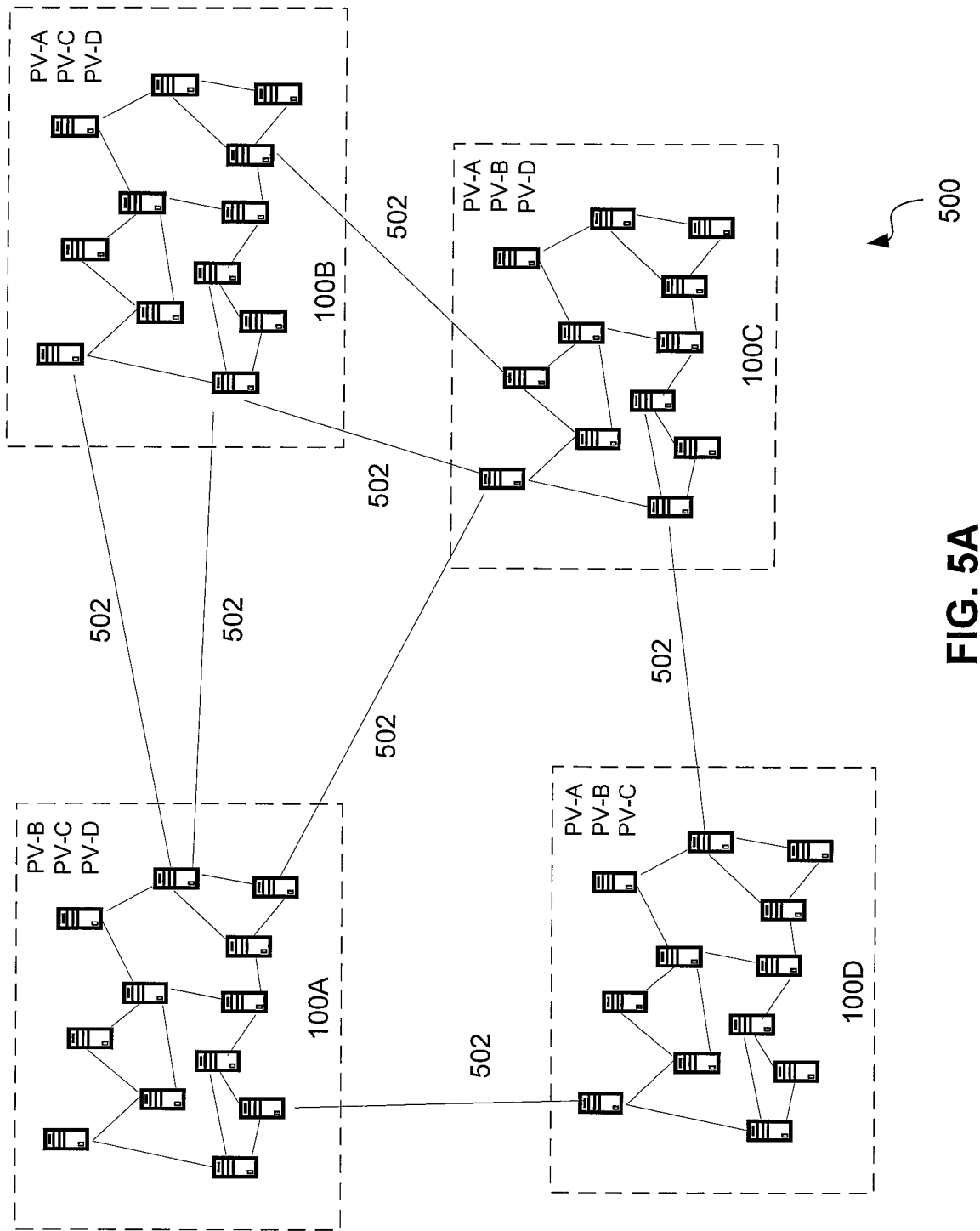
FIG. 5A is a diagram depicting a system architecture which uses foreign payment verification (PV) nodes for performing cross-ledger transfers in accordance with an embodiment of the present invention.

In the example shown in FIG. 5A, a first distributed ledger A is maintained by a first distributed ledger network 100A, a second distributed ledger B is maintained by a second distributed ledger network 100B, a third distributed ledger C is maintained by a third distributed ledger network 100C, and a fourth distributed ledger D is maintained by a fourth distributed ledger network 100D. Each of these distributed ledger networks (100A, 100B, 100C and 100D) includes its own nodes 102 with interconnections 104 therebetween, as described above in relation to FIG. 1. In addition, in accordance with an embodiment of the invention, there are further communicative interconnections 502 between some nodes 102 in the different consensus networks so as to communicatively interconnect the consensus networks (100A, 100B, 100C and 100D).

However, merely communicatively interconnecting the distributed ledger networks of the co-ledgers is insufficient because inter-ledger transaction submission and verification are also needed to support cross-ledger transfers. For this reason, at least some of the nodes 102 in each distributed ledger network may be configured to run both a "local" full node-stack for its own distributed ledger and a "foreign" PV node-stack for the co-ledgers with which it is to interact.

A full node-stack for a distributed ledger includes a set of software routines or programs at a full node of the distributed ledger network. The set of software routines or programs performs tasks and/or functions relating to the distributed ledger, including, if applicable: converting API (application program interface) requests to distributed ledger transactions; managing user keys; signing transactions; notifying other systems when transactions are committed; submitting transactions to the distributed ledger; and providing proofs of inclusion for transactions. A PV node-stack for a distributed ledger includes a reduced set of software routines or programs at a client communicating with the distributed ledger network. The reduced set of software routines or programs performs tasks and/or functions including: providing proofs of inclusion for transactions; and submitting transactions to the distributed ledger.

In the example of FIG. 5A, at least some of the nodes 102 in the first network 100A have been configured to also run PV nodes (PV-B, PV-C and PV-D) for each of the second, third and fourth networks (100B, 100C and 100D). Similarly, at least some of the nodes 102 in the second network 100B have been configured to also run PV nodes (PV-A, PV-C and PV-D) for each of the first, third and fourth networks (100A, 100C and 100D). Also, at least some of the nodes 102 in the third network 100C have been configured to also run PV nodes (PV-A, PV-B and PV-D) for each of the first, second and fourth networks (100A, 100B and 100D). Finally, at least some of the nodes 102 in the fourth network 100D have been configured to also run PV nodes (PV-A, PV-B and PV-C) for each of the first, second and third networks (100A, 100B and 100C).

Each PV-A node maintains a chain of block headers and signatures (i.e. a block header/signature chain) for co-ledger A. Similarly, each PV-B node maintains a block header/signature chain for co-ledger B, each PV-C node maintains a block header/signature chain for co-ledger C, and each PV-D node maintains a block header/signature chain for co-ledger D.

Figure 5B:
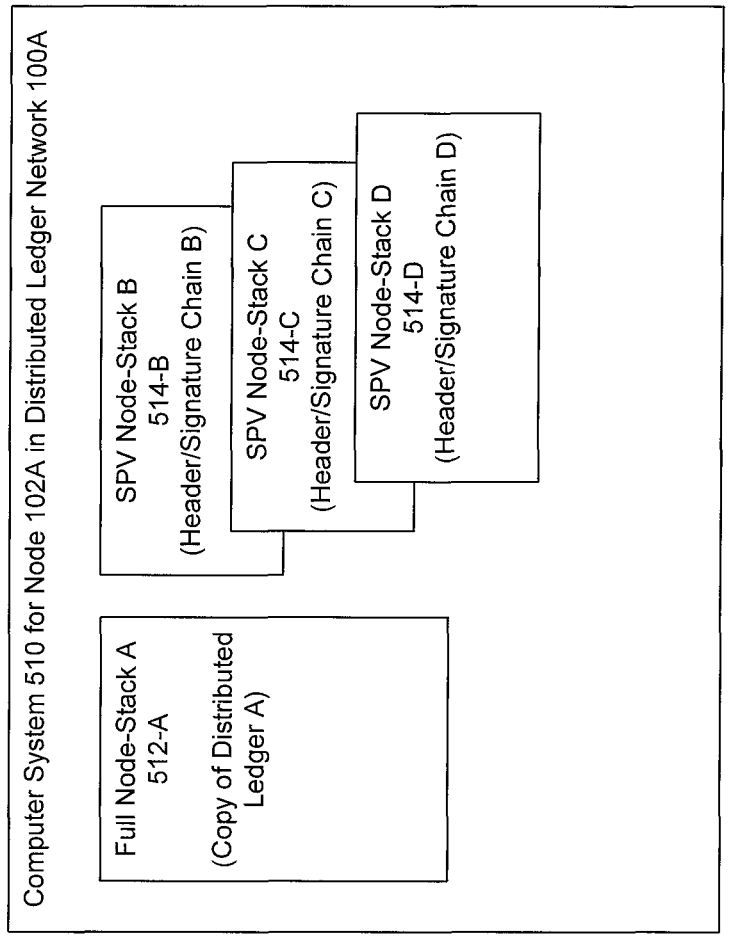
FIG. 5B is a diagram depicting a computer apparatus for a node in the system architecture of FIG. 5A in accordance with an embodiment of the present invention.

FIG. 5B depicts an exemplary implementation of a computer system 510 for a node 102A in a distributed ledger network 100A within the system architecture of FIG. 5A in accordance with an embodiment of the invention. The computer system 510 may be implemented using multiple processors, including one or more central processing units (CPUs) and one or more graphics processing units (GPUs), for example.

As shown, the computer system 510 includes a full node-stack A 512-A for the local distributed ledger A. The full node-stack A 512-A includes a complete copy of the local distributed ledger A.

In addition, the computer system 510 includes a SPV node-stack B 514-B for the foreign distributed ledger B, a SPV node-stack C 514-C for the foreign distributed ledger C, and a SPV node-stack D 514-D for the foreign distributed ledger D. The SPV node-stack B 514-B includes a block header/signature chain for the foreign distributed ledger B. The SPV node-stack C 514-C includes a block header/signature chain for the foreign distributed ledger C. The SPV node-stack D 514-D includes a block header/signature chain for the foreign distributed ledger D.

Figure 5C:
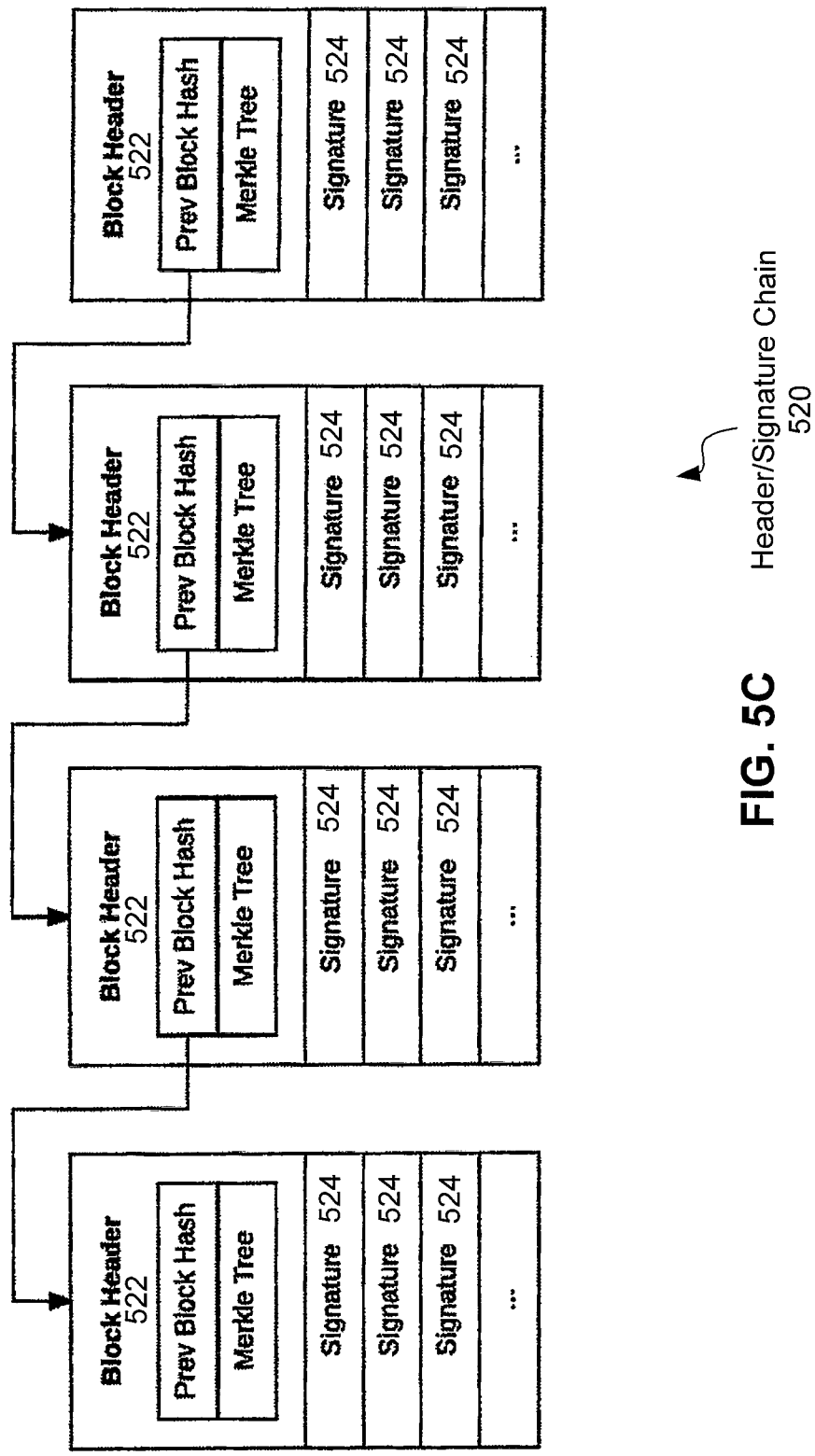
FIG. 5C is a diagram depicting a chain of block headers and block signatures used by a foreign PV node in accordance with an embodiment of the present invention.

The structure of a block header/signature chain that may be maintained at a PV node, particularly a PV node implemented as an SPV node, is depicted in FIG. 5C. As shown in FIG. 5C, the block header/signature chain 520 includes the block headers 522 and the block signatures 524 of the relevant distributed ledger, where the block signature is a signature by a block validator of the relevant distributed ledger network which indicates that the validator accepts that the block that is signed is valid.

Now consider that the first exemplary multiple distributed ledger system 500, described above in relation to FIG. 5A, is to be constructed so as to achieve a goal of 100,000 transactions per second, for example, and that each co-ledger is capable of individually handling 333 transactions per second. To achieve 100,000 transactions per second, the multiple distributed ledger system 500 of FIG. 5A needs to have on the order of 100,0000/333=300 co-ledgers. If there are 300 co-ledgers, then each participant node must maintain SPV nodes for approximately 300 other distributed ledgers. (A participant node or validator in a distributed ledger is a node that is allowed to vote on the validity of blocks. A supermajority (for example, two-thirds or more) of the validators in the distributed ledger generally must agree on the validity of the block for it to be committed to the chain.)

It may be estimated that each distributed ledger will produce about 7 kilobytes of data per second to be maintained by an SPV node for that ledger. The data includes the block header and block signatures for that distributed ledger. This 7 kilobytes per second per co-ledger estimate assumes that we have no more than about 100 consensus participants for each co-ledger, with a two-thirds (⅔) threshold of votes required, and that there are 100 bytes per signature.

This results in about 300 distributed ledgers×7 kilobytes/second/ledger=2,100 kilobytes/second of additional committed storage to co-locate a "foreign" SPV node at each participating "local" full node. This estimated additional storage requirement is about two times the storage requirement without co-locating foreign SPV nodes.

In addition to this additional storage requirement, an index of block hashes to block headers in the block header/signature chain may be provided with the SPV node. The index may be used for the Merkle tree referencing depicted in FIG. 4 so as to perform inter-ledger verification.

As the additional storage requirement for the PV nodes is manageable, the "foreign" PV nodes for all the other co-ledgers may be co-located at some, or all of, the participating "local" nodes of a co-ledger. Furthermore, using the index provided with each PV node, the participating node may efficiently find the pertinent Merkle root so as to readily verify a transaction reference.

Second Exemplary System Architecture: Set of Shared Nodes

Figure 6A:
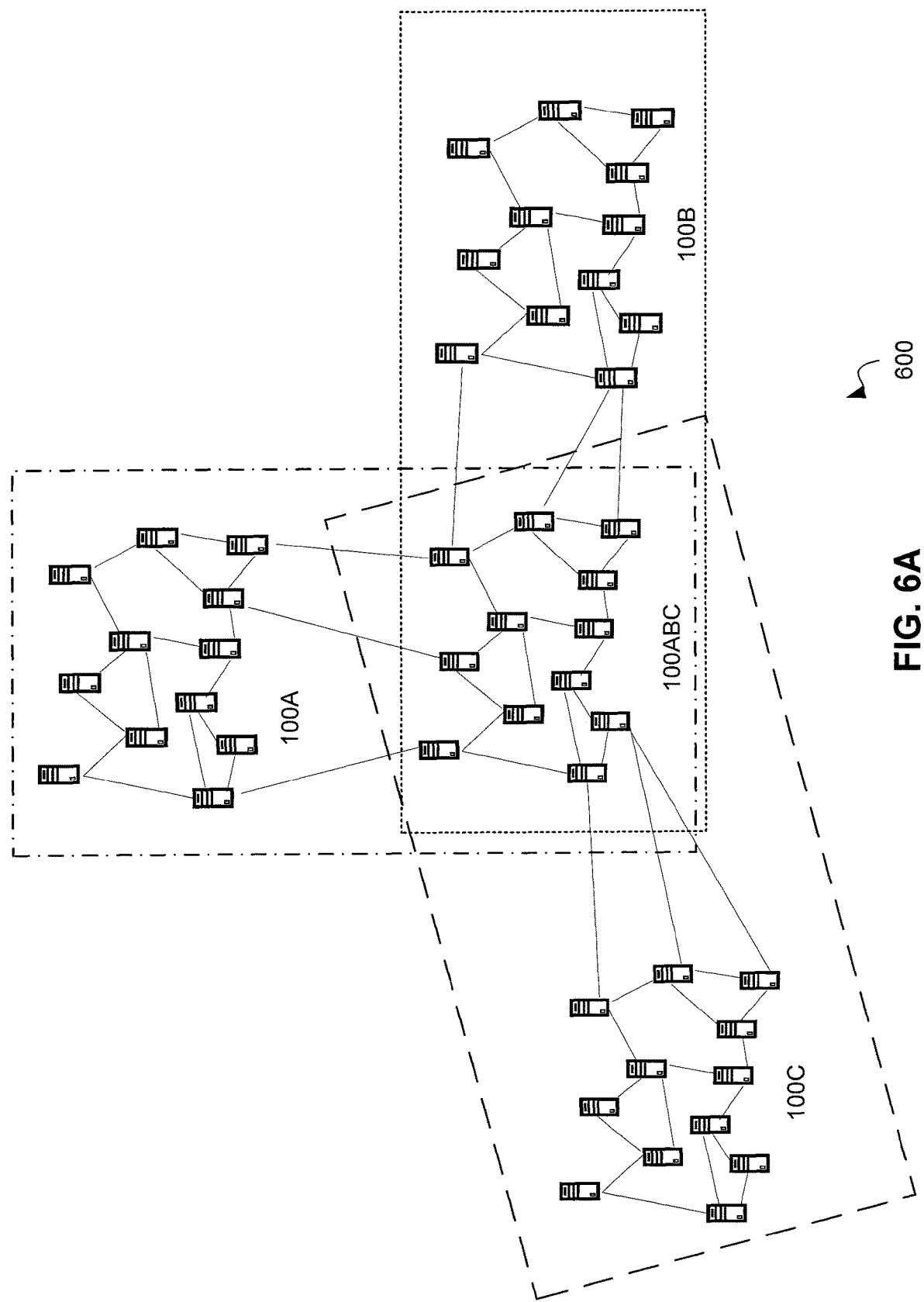
FIG. 6A is a diagram depicting a system architecture which uses nodes shared by multiple distributed ledger networks for performing cross-ledger transfers in accordance with an embodiment of the present invention.

In a second exemplary system architecture 600 depicted in FIG. 6A, a set of nodes are shared by all the distributed ledger networks in the multiple distributed ledger system. Each of these shared nodes may operate as a full node for all the co-ledgers of the multiple distributed ledger system so as to efficiently support cross-ledger transfers. Note that, while a multiple distributed ledger system with three co-ledgers is depicted in FIG. 6A, any number of co-ledgers may be included in the system.

In the example shown in FIG. 6A, a first distributed ledger A is maintained by a first distributed ledger network 100A, a second distributed ledger B is maintained by a second distributed ledger network 100B, and a third distributed ledger C is maintained by a third distributed ledger network 100C. Each of these distributed ledger networks (100A, 100B, and 100C) includes nodes 102 with interconnections 104 therebetween, as described above in relation to FIG. 1.

In accordance with an embodiment of the invention, there is a shared set of full nodes (100ABC). Each node in the shared set 100ABC is operational as a full node of each of the three distributed ledger networks (100A, 100B, and 100C). As such, each node in the shared set 100ABC contains a copy of each of the three distributed ledgers (A, B and C). Note that the three distributed ledgers (A, B, C) remain separate distributed ledgers, each recording a separate ledger of transactions.

In accordance with an embodiment of the invention, an index of block hashes to block headers for each distributed ledger in the system may be created from the distributed ledger data and provided at each node in the shared set of full nodes (100ABC). The index may be used for the Merkle tree referencing depicted in FIG. 4 (from locking transaction 406 to initiating transaction 404, and from completing transaction 408 to locking transaction 406) so as to perform inter-ledger verification.

Any participant node may send a query through the network to a node of the shared set of full nodes (100ABC) to verify cross-ledger transactions. This implies a trust in a central entity or other trusted entry to guarantee or certify that the provided full nodes for the co-ledgers are not lying about the contents of the co-ledgers.

Figure 6B:
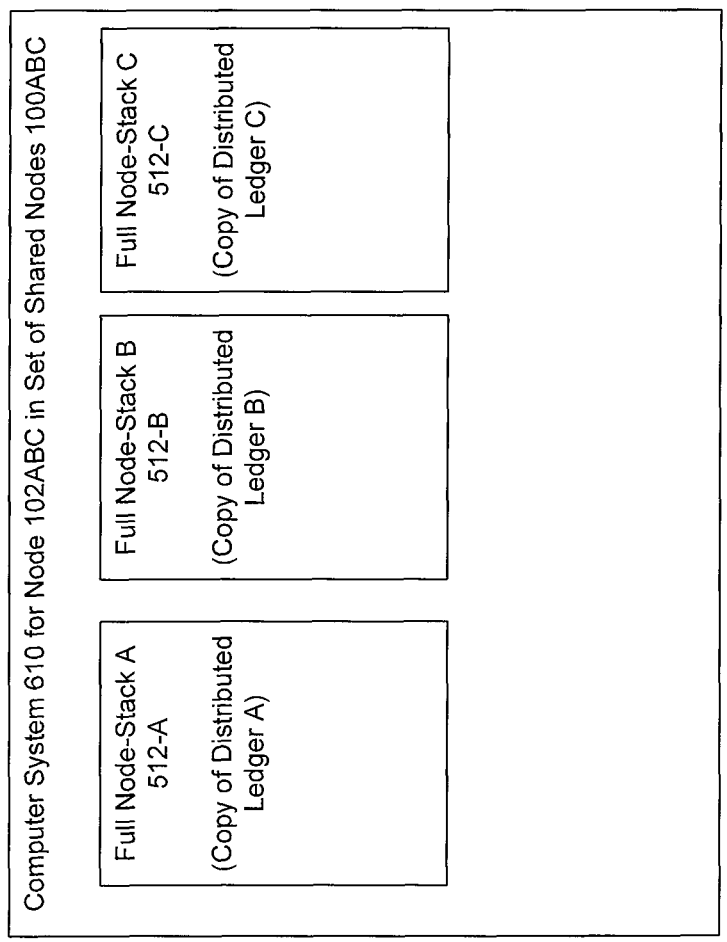
FIG. 6B is a diagram depicting a computer apparatus for a shared node in the system architecture of FIG. 6A in accordance with an embodiment of the present invention.

FIG. 6B depicts an exemplary implementation of a computer system 610 for a node 102ABC in the set of shared nodes 100ABC within the system architecture of FIG. 6A in accordance with an embodiment of the invention. As shown, the computer system 610 includes a full node-stack A 512-A for the local distributed ledger A, a full node-stack B 512-B for the local distributed ledger B, and a full node-stack C 512-C for the local distributed ledger C. The full node-stack A 512-A includes a complete copy of the local distributed ledger A. The full node-stack B 512-B includes a complete copy of the local distributed ledger B. The full node-stack C 512-C includes a complete copy of the local distributed ledger C.

Flowchart of an Exemplary Cross-Ledger Transfer

Figure 7:
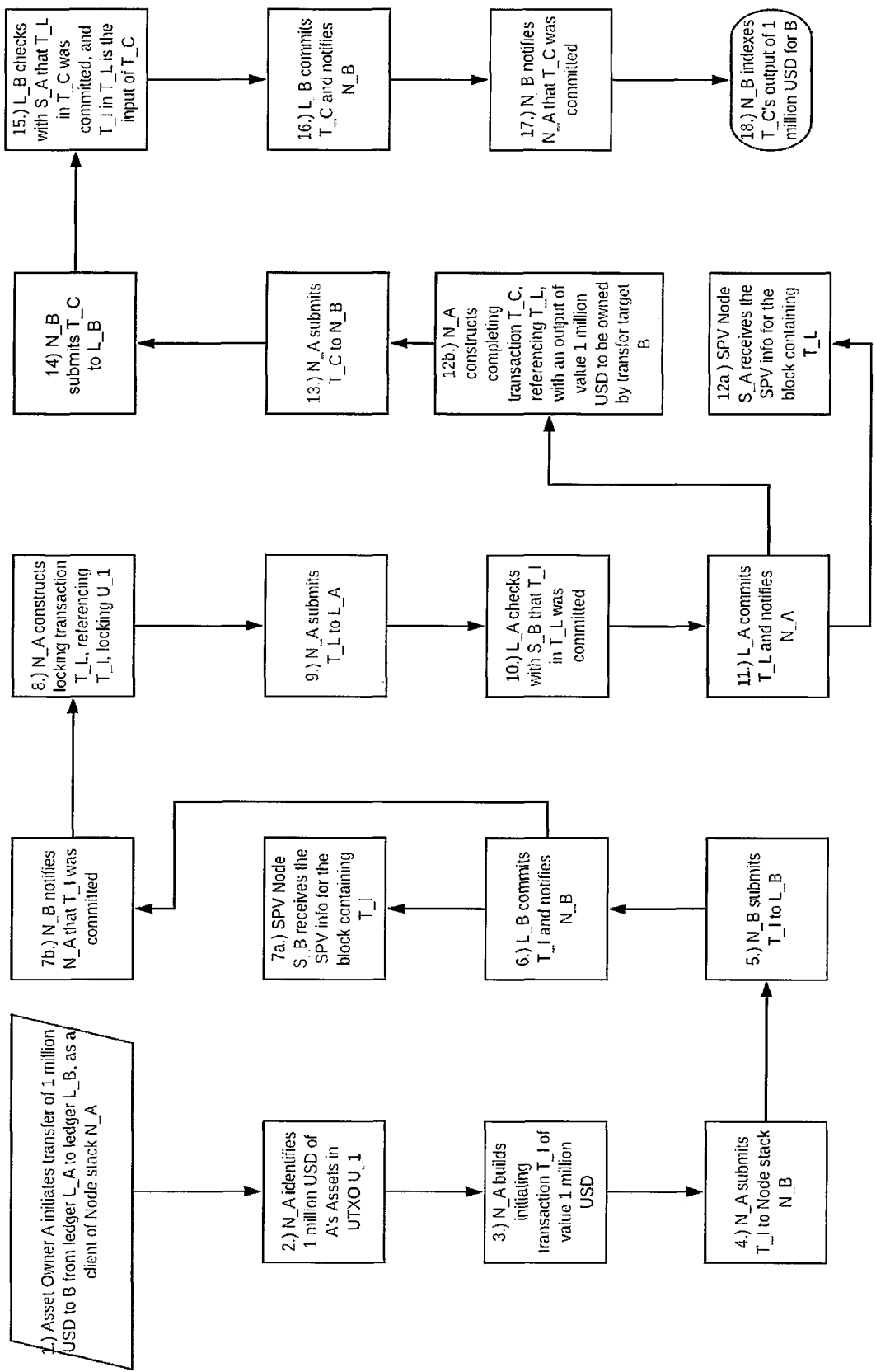
FIG. 7 is a flow chart of a method for an owner of a digitally-represented economic value on a source distributed ledger to transfer the digitally-represented economic value to an entity on a target distributed ledger in accordance with an embodiment of the present invention.

FIG. 7 is a flow chart of a method 700 for an owner of a digitally-represented economic value on a source distributed ledger to transfer the digitally-represented economic value to an entity on a target distributed ledger in accordance with an embodiment of the present invention. In the particular example depicted, the value to be transferred is one million US dollars (USD).

Components used by the method 700 may include the following: a source distributed ledger L_A; a target distributed ledger L_B; a first network node that has a full node-stack (N_A) of L_A and which is also configured to operate as at least an SPV node (S_B) of L_B (and so includes at least the block headers for L_B); and a second network node that has a full node-stack (N_B) of L_B and which is also configured to operate as at least an SPV node (S_A) of L_A (and so includes at least the block headers for L_A).

The node-stack N_A may have the following data and capabilities: an index of UTXOs on the assets of each entity using L_A; capability to construct transactions with those UTXOs; capability to listen for committed transactions from L_A; capability to submit transactions to a foreign node-stack (for example, N_B) to be committed to the foreign distributed ledger (for example, L_B); capability to listen for committed transactions from a foreign node-stack (for example, N_B), where the transactions were submitted by itself; capabilities to accept and index transactions submitted by a foreign node-stack (for example, N_B); and capability to push out committed transactions from L_A to a foreign node-stack (for example, N_B), if the committed transaction was submitted by itself.

Similarly, the node-stack N_B may have the following data and capabilities: an index of UTXOs on the assets of each entity using L_B; capability to construct transactions with those UTXOs; capability to listen for committed transactions from L_B; capability to submit transactions to a foreign node-stack (for example, N_A) to be committed to the foreign distributed ledger (for example, L_A); capability to listen for committed transactions from a foreign node-stack (for example, N_A), where the transactions were submitted by itself; capabilities to accept and index transactions submitted by a foreign node-stack (for example, N_A); and capability to push out committed transactions from L_A to a foreign node-stack (for example, N_A), if the committed transaction was submitted by itself.

Per step 1, as a client of node-stack N_A, entity A which is the asset owner and transfer source initiates a cross-ledger transfer of the specified value (in this example, one million USD) from the source distributed ledger A (L_A) to entity B on the target distributed ledger B (L_B). Pseudo code relating to step 1 to be implemented in a full node-stack (for example, in node-stack N_A) is provided in lines 1-2 of FIG. 9.

Per step 2, node-stack N_A identifies the specified value of entity A's assets in UTXO U_1 in L_A. Pseudo code relating to step 2 to be implemented in a full node-stack (for example, in node-stack N_A) is provided in lines 3-4 of FIG. 9.

Per step 3, N_A builds the initiating transaction T_I of the specified value. Pseudo code relating to step 3 to be implemented in a full node-stack (for example, in node-stack N_A) is provided in lines 5-6 of FIG. 9.

Per step 4, N_A submits T_I to node-stack N_B. Pseudo code relating to step 4 to be implemented in a full node-stack (for example, in node-stack N_A) is provided in lines 11-14 of FIG. 9 which calls the pseudo code routine in FIG. 11.

Per step 5, node-stack N_B submits T_I to L_B. Pseudo code relating to step 5 to be implemented in a full node-stack (for example, in node-stack N_B) is provided in lines 5-6 of FIG. 11 which calls the pseudo code routine in FIG. 12.

Per step 6, L_B commits T_I and notifies N_B once T_I has been committed. Step 6 may be performed using conventional code for the distributed ledger.

After T_I has been committed to L_B, then, per step 7a, SPV node S_B receives the SPV information (i.e. the header and signatures) for the block containing T_I. In addition, per step 7b, N_B notifies N_A that T_I was committed. Pseudo code relating to steps 7a and 7b to be implemented in a full node-stack (for example, in node-stack N_B) is provided by the pseudo code in FIGS. 13 and 14.

Per step 8, N_A constructs the locking transaction T_L which references T_I and locks U_1. Pseudo code relating to step 8 to be implemented in a full node-stack (for example, in node-stack N_A) is provided in lines 7-12 of FIG. 10.

Per step 9, N_A submits T_L to L_A. Pseudo code relating to step 9 to be implemented in a full node-stack (for example, in node-stack N_A of distributed ledger L_A) is in lines 13-14 of FIG. 10 which calls the pseudo code routine in FIG. 12.

Per step 10, L_A checks with S_B to verify that T_I (which is referenced in T_L) was committed by L_B. Pseudo code relating to step 10 to be implemented by a distributed ledger (for example, distributed ledger L_A) is provided in FIG. 12. An exemplary procedure for verifying that a transaction is committed in a foreign distributed ledger is described below in relation to FIG. 8.

Per step 11, after successful verification, L_A commits T_L and notifies N_A once T_L is committed. Step 11 may be performed using conventional code for the distributed ledger.

After T_L has been committed to L_A, then, per step 12a, SPV node S_A receives the SPV information (i.e. the header and signatures) for the block containing T_L. In addition, per step 12b, N_A constructs the completing transaction T_C which references T_L and has an output of the specified value to be owned by the transfer target B. Pseudo code relating to steps 12a and 12b to be implemented in a full node-stack (for example, in node-stack N_A) is provided by the pseudo code in FIGS. 13 and 14.

Per step 13, N_A submits T_C to N_B. Pseudo code relating to step 13 to be implemented in a full node-stack (for example, in node-stack N_A) is provided in lines 27-30 of FIG. 10 and the pseudo code in FIG. 11.

Per step 14, N_B submits T_C to L_B. Pseudo code relating to step 14 to be implemented in a full node-stack (for example, in node-stack N_A of distributed ledger L_A) is provided by the pseudo code in FIG. 12.

Per step 15, L_B checks with S_A to verify that T_L (which is referenced in T_C) was committed by L_A, and L_B also checks to verify that the input to T_C is the output of T_I (which is referenced in T_L). Pseudo code relating to step 10 to be implemented by a distributed ledger (for example, distributed ledger L_B) is provided in FIG. 12. An exemplary procedure for verifying that a transaction is committed in a foreign distributed ledger is described below in relation to FIG. 8.

Per step 16, after the successful verifications, L_B commits T_C and notifies N_B once T_C is committed. Step 16 may be performed using conventional code for the distributed ledger.

Per step 17, N_B notifies N_A that T_C was committed by L_B. Pseudo code relating to step 17 to be implemented in a full node-stack (for example, in node-stack N_B) is provided in FIG. 14.

Lastly, per step 18, N_B indexes the output of T_C for entity B. Pseudo code relating to step 18 to be implemented in a full node-stack (for example, in node-stack N_B) is provided in lines 33-34 of FIG. 10.

Note that the method 700 described above is particularly suited for use with the first system architecture 500 depicted in FIG. 5A. This is because the first system architecture 500 co-locates SPV nodes of a foreign distributed ledger with full nodes of a local distributed ledger.

The method 700 may be readily modified for use with the second system architecture 600 depicted in FIG. 6. The second system architecture 600 co-locates full nodes of a foreign distributed ledger with full nodes of a local distributed ledger. As such, steps 7a and 12a of the method 700 are not needed. Furthermore, L_A may check with N_B to verify that T_I was committed in step 10, and L_B may check with N_A to verify that T_C was committed in step 15.

Inter-Ledger Transaction Verification

In order to verify transaction references in foreign distributed ledgers, it is necessary to have a trustworthy verification mechanism for what is being committed into these other distributed ledgers. Such a mechanism for verifying a transaction in another distributed ledger is not provided by conventional distributed ledger technology.

An exemplary process 800 for verifying transactions in a foreign distributed ledger is shown in FIG. 8. The process 800 may be applied, for example, in step 10 of FIG. 7 to verify that the initiating transaction exists in the target distributed ledger, and in step 15 of FIG. 7 to verify that the locking transaction exists in the source distributed ledger.

Per step 801, the reference data of the transaction input for the transaction being verified is passed inside a query from the local node to one or more foreign nodes. The local node is a node of the local distributed ledger, and a foreign node is a node of the foreign distributed ledger in which the transaction is to be verified.

802) The foreign node(s) use the ledger identifier (for example, chain id) in the transaction input to find the correct index to query, the correct index being that associated with the ledger identifier. The input to the index is a block hash for the block that contains the transaction being verified.

803) The foreign node(s) use the block hash in the transaction input to find the correct block to examine.

804) The foreign node(s) extract the block header from the identified block (that was found in step 803).

805) The foreign node(s) extract the Merkle root hash from the identified block.

806) The foreign node(s) compute a transaction hash for the transaction in the transaction input.

807) The foreign node(s) compute a Merkle root hash from the transaction hash and the provided Merkle branch hashes.

808) The foreign node(s) compare the computed Merkle root hash with the Merkle root hash in the identified block.

809) The foreign node(s) returns to the local node that the transaction is valid if the hashes match, invalid if they don't match.

Note that, if multiple foreign nodes are queried in the above-described verification method 800, then the transaction may be considered as validly committed as long as one of the foreign nodes returns that the transaction is valid.

Note also that the method 800 described above may be used in either the first system architecture 500 depicted in FIG. 5A or the second system architecture 600 depicted in FIG. 6. For the first system architecture 500, a foreign node may correspond to a foreign SPV node-stack which is co-located with a local full node-stack. For the second system architecture 600, a foreign node-stack may be a foreign full node-stack which is co-located with a local full node-stack.

FIGS. 9 through 14 show pseudocode that provides a detailed "blueprint" for an exemplary implementation of an embodiment of the present invention. Comments in the pseudocode are preceded by //.

Initiate Transaction

The pseudocode procedure shown in FIG. 9 is performed when a cross-ledger transaction is submitted to a node stack. In order to construct the transaction, a UTXO must be found corresponding to the asset that is to be transacted. Once that UTXO is found, an initiating transaction should be constructed out of that UTXO. This initiating transaction should be indexed for later lookup, along with the source of the transaction and the target of the transaction. The initiating transaction should be signed by the owner of the asset in the UTXO. Then, the target node stack is located, and the initiating transaction is sent to the target node stack, along with knowledge of the source.

Notify Committed Transaction

The pseudocode procedure shown in FIG. 10 is performed when a node stack is notified that a transaction has been committed. There are two cases, depending on whether the transaction is an initiating transaction or a locking transaction.

The first case is if the transaction that is committed is an initiating transaction. When this occurs, we can look up the UTXO that we need to lock from the index described in FIG. 9. We then build a locking transaction out of this UTXO. This transaction needs to be signed by the owner of the asset in the UTXO, which we also look up using the index described in FIG. 9. Finally, we submit this transaction to the local ledger.

The second case is if the transaction that is committed is a locking transaction. When this occurs, we first find the target for the initiating transaction referenced by the locking transaction. This is available from the index described in FIG. 9. We build a completing transaction that references the locking transaction. This completing transaction requires the signature of the owner of the asset being transferred; this can be looked up in the index described in FIG. 9. Finally, we find the node stack for the target, and the completing transaction is sent to the target node stack, along with knowledge of the source.

For all transactions that the node stack is notified of, the available UTXO pool needs to be updated.

Commit Foreign Transaction

The pseudocode procedure shown in FIG. 11 is performed when a node stack receives a transaction from a foreign node stack (such as when an initiating or completing transaction is received). The transaction is indexed to the source that the transaction is received from, then the transaction is submitted to the local distributed ledger.

Submit Transaction to Ledger

The pseudocode procedure shown in FIG. 12 is performed when a distributed ledger receives a submitted transaction. There are some steps that are taken to perform common validations across all transactions, that are skipped (not shown) in the figure. For those transactions that contain SPV references (the locking and completing transactions), we apply certain validations to their inputs.

If we find that an input contains an SPV reference (in the case of the locking and completing transactions), we verify that the SPV reference is valid, by calling a verification API on the SPV node. Furthermore, if we find that an input contains an SPV reference that contains a transaction with an SPV reference (as in the case of a completing transaction), we check if the contained transaction's SPV reference transaction ID matches the initiating transaction that the completing transaction spends. If all validations are passed, the transaction is ready to be committed by the ledger.

Commit Block to Ledger

The pseudocode procedure shown in FIG. 13 is performed when a distributed ledger commits a block containing transactions. The figure does not show the process where the distributed ledger decides how to add transactions to blocks and how the ledgers reach consensus on blocks, as those topics are beyond the scope of this disclosure. In the procedure shown, the ledger stores the block to some persisted storage, sends SPV info for the block to the SPV node, then notifies the local node stack that the block has been committed.

Send Messages for Committed Transactions

The pseudocode procedure of FIG. 14 shows how a local node stack distributes notifications regarding committed transactions. This procedure is performed for the initiating and completing transactions.

For all transactions in a block, the local node stack looks in the foreign index (defined in FIG. 11) to determine whether the transaction had a foreign source. If the transaction had a foreign source, the local node stack finds the node stack for the foreign source and sends the committed transaction and SPV information for the committed transaction over to that foreign node stack. The local node stack is notified of all committed transactions (whether the source is local or foreign).

Transaction Structures

FIG. 15 shows a general structure for a standard transaction 1500 which may include a cross-ledger referenced transaction input accordance with an embodiment of the present invention. The standard transaction in FIG. 15 includes a list of transaction inputs and a list of transaction outputs.

In this case, there are two types of transaction inputs. A first type of transaction input is an intra-ledger (i.e. standard) transaction input 1502. Each intra-ledger transaction input includes bytes which identify the input transaction and an integer which provides the output offset for the input transaction.

A second type of transaction input is a cross-ledger referenced transaction input 1504. Each cross-ledger referenced transaction input includes bytes which identify the foreign ledger, bytes for a block hash which identifies the block within the foreign ledger, a list of Merkle branch hashes for the transactions in the identified block, transaction bytes of the input transaction within the identified block, and an integer offset which provides the offset for a specific output being referenced within the given transaction bytes.

Each transaction output 1506 includes bytes which identify the digital property being output and a bytes lock which is an encoded lock for the transaction output. The bytes lock is unlocked by providing a signature from the matching private key.

Figure 17:
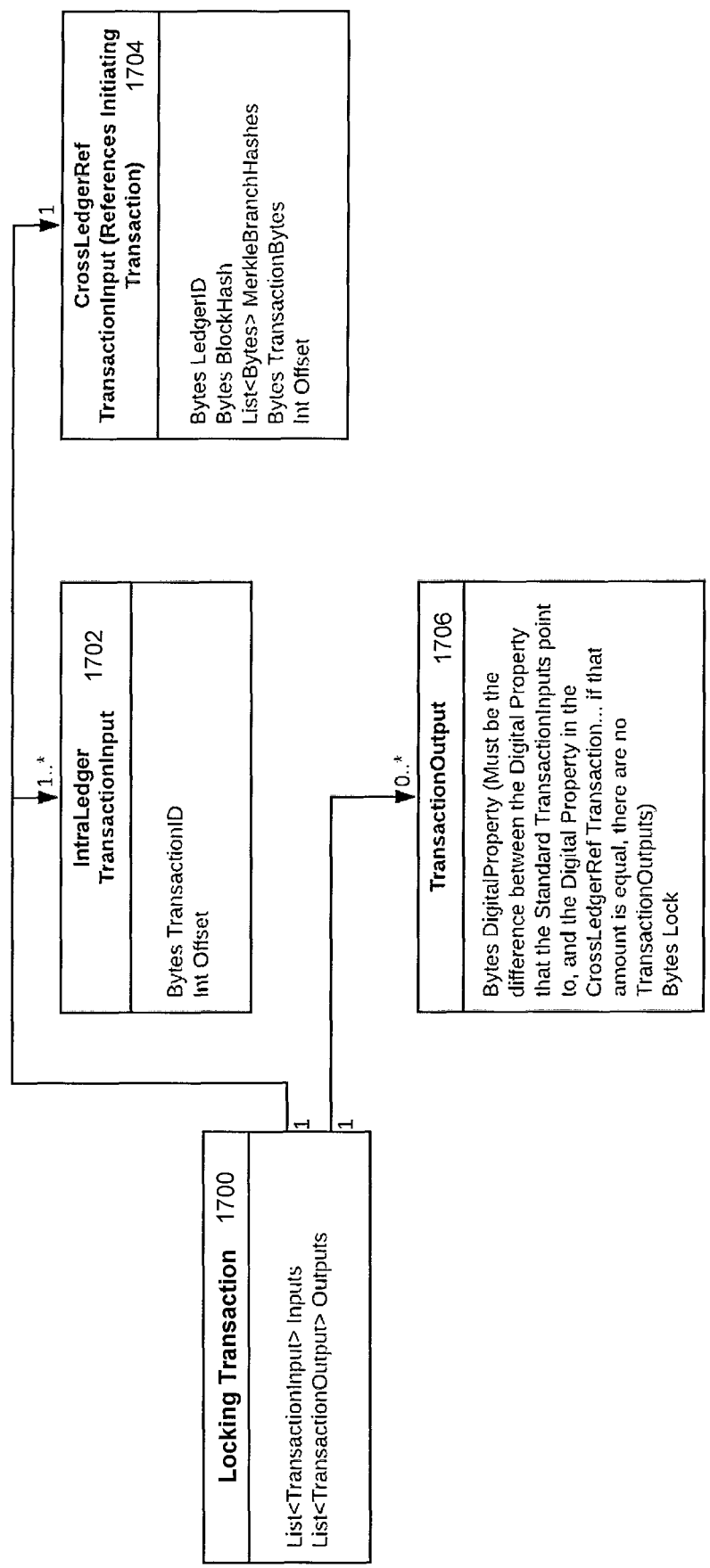
FIG. 17 shows a structure for a locking transaction of a three-transaction cross-ledger transfer in accordance with an embodiment of the present invention.
Figure 18:
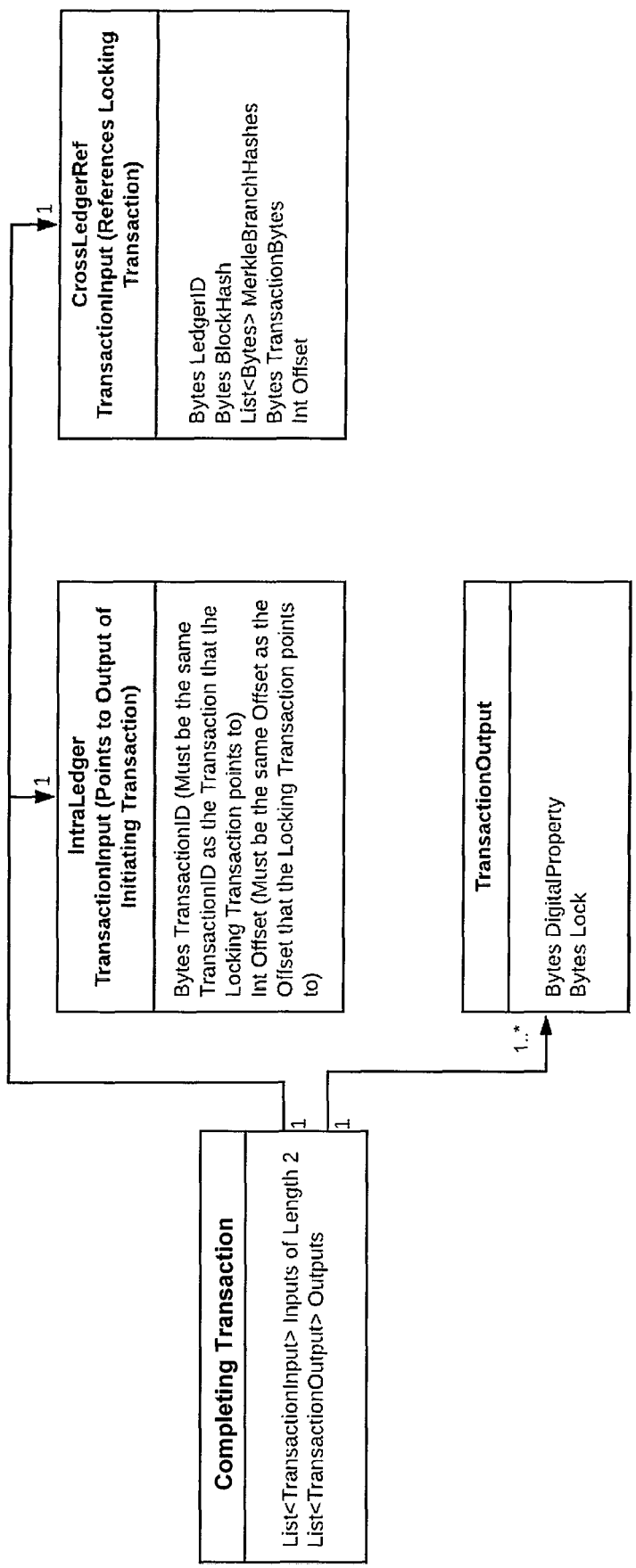
FIG. 18 shows a structure for a completing transaction of a three-transaction cross-ledger transfer in accordance with an embodiment of the present invention.

FIGS. 16 through 18 show structures for the three transactions which together provide a cross-ledger transfer in accordance with an embodiment of the present invention. These three structures may be used to implement the three-transaction cross-ledger transfer 400 depicted in FIG. 4.

FIG. 16 shows a specific structure for an initiating transaction 1600 of the three-transaction cross-ledger transfer in accordance with an embodiment of the present invention. The initiating transaction includes no transaction inputs and a single transaction output 1606.

The transaction output 1606 includes bytes that identify the digital property being transferred and a byte lock. The byte lock may be unlocked (for spending the digital property) only by a completing transaction with a reference to a locking transaction which references this initiating transaction.

FIG. 17 shows a specific structure for a locking transaction 1700 of the three-transaction cross-ledger transfer in accordance with an embodiment of the present invention. The locking transaction 1700 includes a list of transaction inputs and a list of transaction outputs.

The transaction inputs include one or more intra-ledger transaction input 1702 and a single cross-ledger reference transaction input 1704.

Each intra-ledger transaction input 1702 includes bytes which identify an input transaction in the source ledger and an integer which provides the output offset for that transaction. Each input transaction corresponds to an existing transaction in the source ledger, and the output offset indicates a specific output of the existing transaction that is being input to the locking transaction 1700.

The cross-ledger reference transaction input 1704 is used to reference the initiating transaction in the target ledger. The cross-ledger reference transaction input 1704 includes bytes which identify the target ledger, bytes for a block hash which identifies the block within the target ledger, a list of Merkle branch hashes for the transactions in the identified block, transaction bytes of the initiating transaction within the identified block, and an integer offset which provides the offset for a specific output being referenced within the given transaction bytes.

The locking transaction 1700 does not need any transaction output 1706 and so may have zero or more transaction outputs 1706. If there is a transaction output 1706, it includes bytes that identify the digital property being output and a byte lock. The digital property of the transaction outputs 1706 must be equal to the difference between the digital property that the intra-ledger transaction inputs 1702 point to (from the output or outputs of one or more existing transactions) and the digital property that the cross-ledger reference transaction input 1704 points to (from the specified output of the initiating transaction). If those amounts of digital property are equal, then there is no transaction output 1706.

FIG. 18 shows a specific structure for a completing transaction 1800 of the three-transaction cross-ledger transfer in accordance with an embodiment of the present invention. The completing transaction 1800 includes two transaction inputs and one or more transaction outputs.

The two transaction inputs include a single intra-ledger transaction input 1802 and a single cross-ledger reference transaction input 1804.

The intra-ledger transaction input 1802 includes bytes of a transaction ID which identifies the initiating transaction in the target ledger and an integer which provides the output offset for that transaction. The output offset indicates a specific output of the initiating transaction that is being input to the completing transaction 1800. This transaction ID in the intra-ledger transaction input 1802 must match the transaction ID of the initiating transaction pointed at by the locking transaction; otherwise, the completing transaction will be invalid.

The cross-ledger reference transaction input 1804 is used to reference the locking transaction in the source ledger. The cross-ledger reference transaction input 1804 includes bytes which identify the source ledger, bytes for a block hash which identifies the block within the source ledger, a list of Merkle branch hashes for the transactions in the identified block, transaction bytes of the locking transaction within the identified block, and an integer offset which provides the offset for a specific output being referenced within the given transaction bytes, if any.

There may be one or more transaction outputs 1806. Each transaction output 1806 includes bytes which identify the digital property being output and a bytes lock which is an encoded lock for the transaction output. The bytes lock is unlocked by providing a signature from the matching private key.

System Performance Calculations Showing Scalability Gains

This section describes scalability gains as evidenced by calculations of system performance for a system having multiple distributed ledgers (for example, multiple blockchains).

The variable definitions for the calculations are as follows:
R=the number of remittances per second per ledger;
X=the number of intra-ledger transactions per second per ledger;
Y=the number of inter-ledger transactions per second per ledger; and
N=the number of co-ledgers in the system.

The assumptions for the calculations are as follows:
1) A worst-case distribution of transactions across the N distributed ledgers is assumed such that ratio of intra-ledger transactions to inter-ledger transactions of 1 to N−1;
2) Blocks are one megabyte (1 MB) in size;
3) The processing rate for blocks of a distributed ledger is 1 block per second;
4) Intra-ledger transactions take about 1000 bytes=1 kilobyte;
5) The worst-case size of a transaction reference is $\log_2(3000)*32$ bytes+32 bytes=416 bytes; and
6) Inter-ledger transactions to transfer digitally-represented economic value each constitutes 5 transactions and take 2814 bytes in total due to the following steps:
   a) Subscriber send transaction takes about 333 bytes;
   b) Initiating transaction takes about 200 bytes;
   c) Locking transaction takes size of initiating+416 bytes+100 bytes=716 bytes;
   d) Completing transaction takes size of locking+416 bytes+100 bytes=1232 bytes; and
   e) Subscriber receive transaction takes about 333 bytes.

Based on the above definitions and assumptions, the following calculations are made:

X/Y=1/(N−1) by the ratio of intra-ledger to inter-ledger transactions being 1/(N−1).

$10^6$=1000X+2814Y by the block size of 1 MB and the size of the two types of transactions being 1000 bytes and 2814 bytes.

R=X+Y because the remittances per second per ledger is the sum of the intra-ledger transactions per second per ledger and the inter-ledger transactions per second per ledger.

Solving for R as a function of N gives R=$10^6$N/(2814N−1814).

If we target N*R=$10^5$ remittances per second (RPS) in aggregate for the system, then we obtain the following quadratic equation.

$$N^2-281.4N+181.4=0$$

Solving for the roots of the above equation and taking the result that must be greater than one for practical reasons gives the number of co-ledgers N=281. This result means that, given the assumptions above, 281 co-ledgers must be run which each commit 1 MB per second in order to have an aggregate transaction throughput of $10^5$ RPS for the system.

Figure 19:
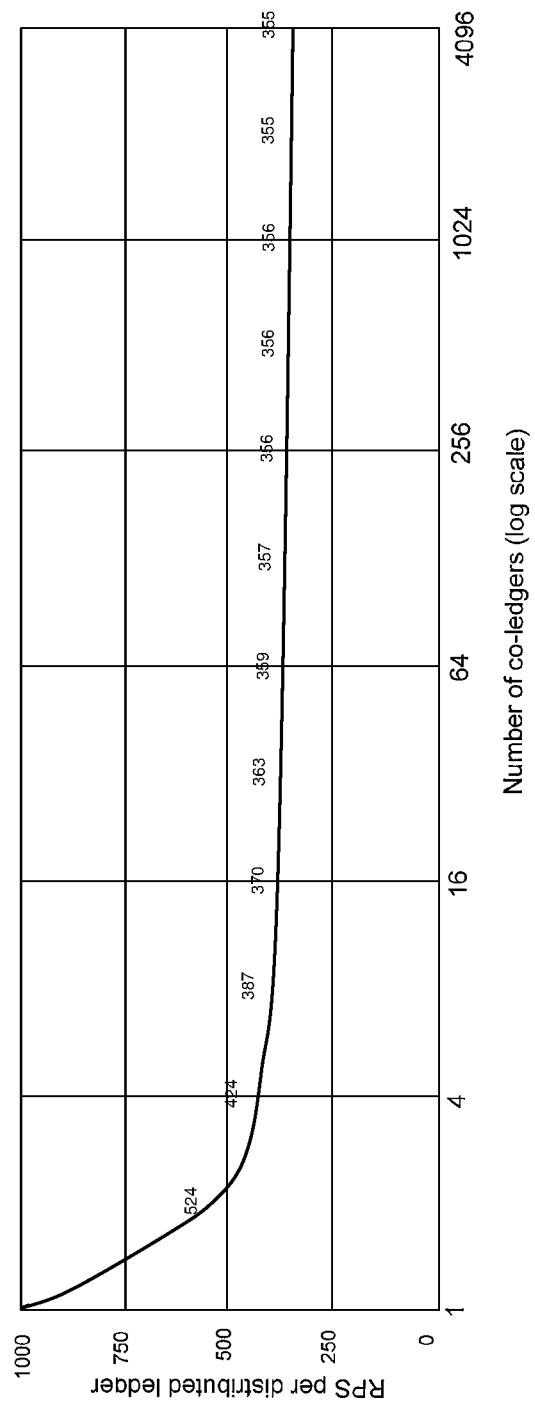
FIG. 19 is a graph showing the calculated transaction throughput per ledger as a function of the number of distributed ledgers in the system in accordance with an embodiment of the present invention.

The calculated transaction throughput per co-ledger in RPS as a function of the number of co-ledgers, N, in the system is shown by the graph in FIG. 19 in accordance with an embodiment of the present invention. The total transaction throughput in RPS is equal to the RPS per ledger multiplied by the number of co-ledgers, N. As seen in the graph, at N=281, the RPS per ledger (per co-chain when each ledger is a blockchain) is 356 such that the system throughput is about $10^5$.

Figure 20:
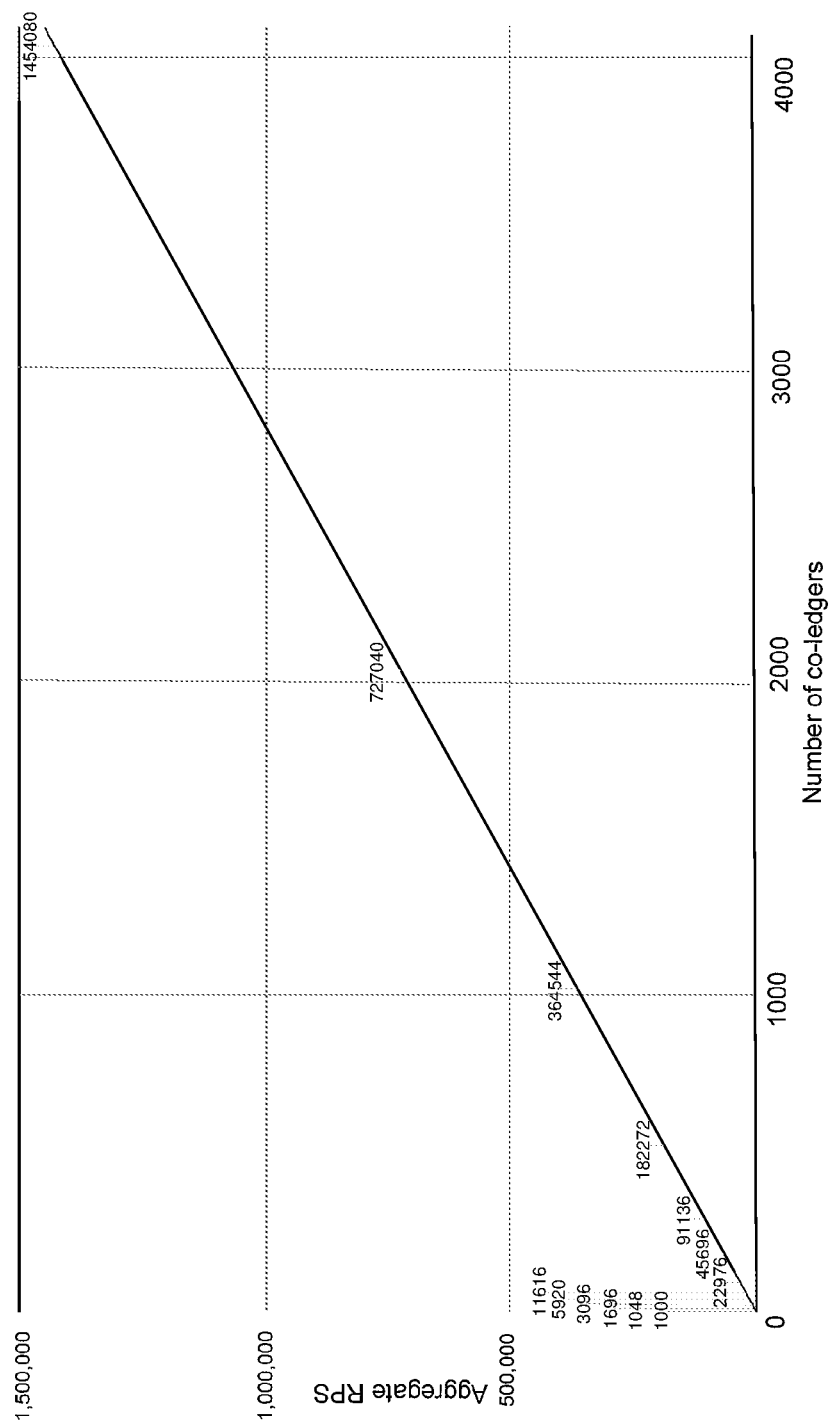
FIG. 20 is chart showing the calculated aggregate transaction throughput as a function of the number of distributed ledgers in accordance with an embodiment of the present invention.

The calculated aggregate transaction throughput for the system in RPS as a function of the number of co-ledgers (co-chains when each ledger is a blockchain) is shown by the graph in FIG. 20 in accordance with an embodiment of the present invention. As shown, the aggregate transaction throughput scales linearly with the number of co-ledgers in the system.

Note that the calculations presented above are based on a worst-case distribution of transactions in the system and a worst-case size of a transaction reference. It is very likely that, at least in many cases, the assignment of nodes to the various consensus networks in the system may be made so as to greatly increase the ratio X/Y of intra-ledger transactions to inter-ledger transactions to be greater than one. In other words, a system is likely to be configurable such that there are more intra-ledger transactions than inter-ledger transactions. In contrast, the worst-case assumption in the above-described calculations is that there are many more inter-ledger transactions than intra-ledger transactions. Hence, the performance of an actual system is potentially much better than the system performance in the above calculations.

Computer System

Figure 21:
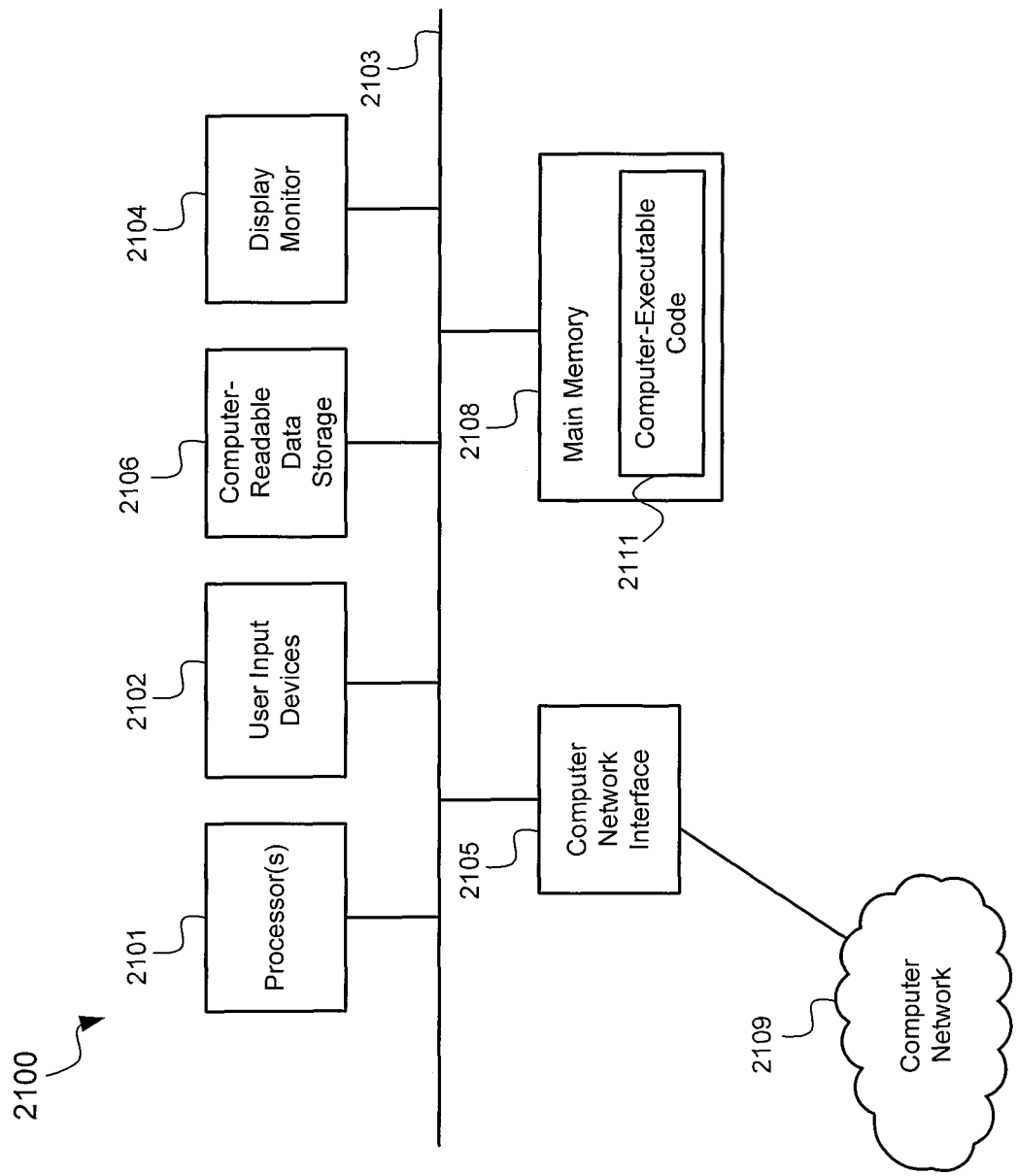
FIG. 21 is a diagram depicting, at a high level, components of a computer system in accordance with an embodiment of the present invention.

FIG. 21 depicts, at a high level, components of a computer system 2100 that may be used, for example, to implement full or partial nodes of a distributed ledger network. A computer system may be implemented with fewer or more components than shown in the figure. For example, the computer systems may include one or more processors 2101 (including graphics processors) and one or more buses 2103 coupling its various components. The computer system may also include one or more user input devices 2102 (e.g., keyboard, mouse), one or more data storage devices 2106 (e.g., hard drives, optical disks, solid state memory disks), one or more display monitors 2104 (e.g., liquid crystal display, flat panel monitor), one or more computer network interfaces 2105 (e.g., network adapter, modem), and a main memory 2108 (i.e., random access memory). As shown, a computer network interface 2105 may be coupled to a computer network 2109, which may be, in this case, a distributed ledger network.

The computer system is a particular machine as programmed with one or more software modules, comprising computer-readable code or instructions stored in a non-transitory manner in the main memory 2108 for execution by the processor 2101. An article of manufacture may be embodied as computer-readable storage medium including instructions that when executed by a processor 2101 causes the computer system to be operable to perform the functions of the one or more software modules.

Exemplary Embodiments

Exemplary embodiments of the presently-disclosed invention include, but are not limited to, the following.

Embodiment A1. A method of spending a digitally-represented economic value in a target distributed ledger where the digitally-represented economic value originates in a source distributed ledger and is owned by an entity, the method comprising:

determining an existing transaction in the source distributed ledger which has a transaction output that is unspent and owned by the entity;

constructing and submitting an initiating transaction for commission to the target distributed ledger, wherein the initiating transaction has a transaction output;

constructing and submitting a locking transaction for commission to the source distributed ledger, wherein the locking transaction spends and locks the transaction output of the existing transaction in the source distributed ledger and references the initiating transaction in the target distributed ledger; and constructing and submitting a completing transaction for commission to the target distributed ledger, wherein the completing transaction spends the transaction output of the initiating transaction in the target distributed ledger and references the locking transaction in the source distributed ledger.

Embodiment A2. The method of Embodiment A1, wherein the transaction output of the initiating transaction is only spendable by the completing transaction when the completing transaction references the locking transaction and when a value of the transaction output of the initiating transaction matches a value of the transaction output of the existing transaction.

Embodiment A3. The method of Embodiment A2, wherein the locking transaction uses a Merkle tree reference to reference the initiating transaction.

Embodiment A4. The method of Embodiment A3, wherein the completing transaction uses a Merkle tree reference to reference the locking transaction.

Embodiment A5. The method of Embodiment A1, wherein the method is performed by a node-stack of the source distributed ledger.

Embodiment A6. The method of Embodiment A5, wherein the initiating and completing transactions are submitted to a node-stack of the target distributed ledger, and the node-stack of the target distributed ledger further submits the initiating and completing transactions to the target distributed ledger.

Embodiment A7. The method of Embodiment A1, wherein the method is performed by a node-stack of the target distributed ledger.

Embodiment A8. The method of Embodiment A7, wherein the locking transaction is submitted to a node-stack of the source distributed ledger, and the node-stack of the source distributed ledger further submits the locking transaction to the source distributed ledger.

Embodiment A9. The method of Embodiment A1, wherein the method is performed in a system that comprises:

a plurality of distributed ledger networks, each said distributed ledger network having a plurality of nodes and communicative connections therebetween; and internetwork connections between the plurality of distributed ledger networks, wherein a distributed ledger network that maintains a local distributed ledger includes a plurality of foreign payment verification nodes for other distributed ledgers in the system.

Embodiment A10. The method of Embodiment A1, wherein the method is performed in a system that comprises:

a plurality of distributed ledger networks, each said distributed ledger network having a plurality of nodes and internetwork connections therebetween; and a set of nodes that are shared by the plurality of distributed ledger networks, wherein nodes in the set provide, among other services, inter-ledger verification of transactions.

Embodiment A11. A non-transitory tangible computer-readable medium comprising instructions stored thereon, that when executed by a processor, perform the steps of:

determining an existing transaction in a source distributed ledger which has a transaction output that is unspent and owned by an entity;

constructing and submitting an initiating transaction for commission to a target distributed ledger, wherein the initiating transaction has a transaction output;

constructing and submitting a locking transaction for commission to the source distributed ledger, wherein the locking transaction spends and locks the transaction output of the existing transaction in the source distributed ledger and references the initiating transaction in the target distributed ledger; and constructing and submitting a completing transaction for commission to the target distributed ledger, wherein the completing transaction spends the transaction output of the initiating transaction in the target distributed ledger and references the locking transaction in the source distributed ledger.

Embodiment A12. The computer-readable medium of claim Embodiment A11, wherein the transaction output of the initiating transaction is only spendable by the completing transaction when the completing transaction references the locking transaction and when a value of the transaction output of the initiating transaction matches a value of the transaction output of the existing transaction.

Embodiment A13. The computer-readable medium of claim Embodiment A12, wherein the locking transaction uses a Merkle tree reference to reference the initiating transaction.

Embodiment A14. The computer-readable medium of claim Embodiment A13, wherein the completing transaction uses a Merkle tree reference to reference the locking transaction.

Embodiment A15. The computer-readable medium of claim Embodiment A11, wherein the instructions are performed by a node-stack of the source distributed ledger.

Embodiment A16. The computer-readable medium of claim Embodiment A11, wherein the instructions are performed by a node-stack of the target distributed ledger.

Embodiment A17. A method of transferring a digitally-represented amount of currency in an unspent transaction output of an existing transaction in a source blockchain to one or more transaction outputs which spend the digitally-represented amount of currency in a target blockchain, the method comprising:

constructing and submitting an initiating transaction for commission to the target blockchain, wherein the initiating transaction has the unspent transaction output which comprises the digitally-represented amount of currency;

constructing and submitting a locking transaction for commission to the source blockchain, wherein the locking transaction spends and locks the transaction output of the existing transaction in the source blockchain and references the initiating transaction in the target blockchain; and constructing and submitting a completing transaction for commission to the target blockchain, wherein the completing transaction references the locking transaction in the source blockchain, and wherein the completing transaction comprises said one or more transaction outputs which spend the digitally-represented amount of currency in the target blockchain.

Embodiment A18. The method of Embodiment A17, wherein the transaction output of the initiating transaction is only spendable by the completing transaction when the completing transaction references the locking transaction and when a value of the transaction output of the initiating transaction matches a value of the transaction output of the existing transaction Embodiment A19. The method of Embodiment A18, wherein the locking transaction uses a Merkle tree reference to reference the initiating transaction.

Embodiment A20. The method of Embodiment A19, wherein the completing transaction uses a Merkle tree reference to reference the locking transaction.

Embodiment A21. The method of Embodiment A1, wherein the distributed ledger comprises a blockchain.

Embodiment A22. The method of Embodiment A1, wherein the distributed ledger utilizes a directed acyclic graph.

Embodiment A23. The computer-readable medium of claim Embodiment A11, wherein the distributed ledger comprises a blockchain.

Embodiment A24. The computer-readable medium of claim Embodiment A11, wherein the distributed ledger utilizes a directed acyclic graph.

Embodiment B1. A system with cross-ledger transfers between multiple distributed ledgers for highly-scalable transaction throughput, the system comprising:

a plurality of distributed ledger networks, each said distributed ledger network maintaining a local distributed ledger and comprising local nodes and communicative connections therebetween;

internetwork connections between the plurality of distributed ledger networks; and foreign payment verification nodes co-located with the local nodes of each said distributed ledger network, wherein the foreign payment verification nodes are used in a cross-ledger transfer for inter-ledger verification of transactions in other distributed ledger networks in the system.

Embodiment B2. The system of Embodiment B1, further comprising, at each said foreign payment verification node:

a block header/signature chain that includes block headers and block signatures for a foreign distributed ledger.

Embodiment B3. The system of Embodiment B2, further comprising, at each said payment verification node:

an index of block hashes to the block headers in the block header/signature chain.

Embodiment B4. The system of Embodiment B1, wherein an existing transaction in a source distributed ledger contains a transaction output whose digitally-represented economic value is to be transferred to a target distributed ledger.

Embodiment B5. The system of Embodiment B4, wherein inter-ledger verification comprises verifying existence of a locking transaction in the source distributed ledger, and wherein the locking transaction spends the transaction output of the existing transaction.

Embodiment B6. The system of Embodiment B5, wherein verification of the existence of the locking transaction in the source distributed ledger is necessary for a completing transaction in the target distributed ledger to spend a transaction output of an initiating transaction in the target distributed ledger.

Embodiment B7. The system of Embodiment B1, wherein said co-location of the local node and the foreign payment verification nodes is implemented by a computer apparatus with one or more processors that includes a local node-stack of the local distributed ledger and foreign payment verification node-stacks of the other distributed ledgers in the system.

Embodiment B8. A system with cross-ledger transfers between a plurality of distributed ledgers for highly-scalable transaction throughput, the system comprising:

a plurality of distributed ledger networks, each said distributed ledger network maintaining a local distributed ledger and comprising local nodes and communicative connections therebetween; and a set of shared nodes, wherein each said shared node comprises local nodes for at least two distributed ledger networks of the plurality of distributed ledger networks.

Embodiment B9. The system of Embodiment B8, further comprising, at each said shared node:

an index of block hashes to block headers for each of the plurality of distributed ledgers.

Embodiment B10. The system of Embodiment B8, wherein each said shared node comprises a computer apparatus which comprises local node-stacks of said at least two distributed ledger networks.

Embodiment B11. The system of Embodiment B8, wherein each said shared node comprises local nodes for all of the plurality of distributed ledger networks.

Embodiment B12. The system of Embodiment B11, wherein each said shared node comprises a computer apparatus which comprises local node-stacks of all of the plurality of distributed ledger networks.

Embodiment B13. The system of Embodiment B8, wherein an existing transaction in a source distributed ledger contains a transaction output whose digitally-represented economic value is to be transferred to a target distributed ledger.

Embodiment B14. The system of Embodiment B13, wherein a locking transaction spends the transaction output of the existing transaction, and wherein verification of the existence of the locking transaction in the source distributed ledger is necessary for a completing transaction in the target distributed ledger to spend a transaction output of an initiating transaction in the target distributed ledger.

Embodiment B15. A system with cross-ledger transfers between a plurality of distributed ledgers for highly-scalable transaction throughput, the system comprising:

a set of computer apparatus, each said computer apparatus comprising memory for holding computer-readable code and data and one or more processors for executing said computer-readable code so as to modify said data;

communicative connections between each said computer apparatus and a plurality of distributed ledger networks; and computer-readable code for local node-stacks of the plurality of distributed ledger networks at each said computer apparatus.

Embodiment B16. The system of Embodiment B15, further comprising, at each said computer apparatus:

an index of block hashes to block headers for each of the plurality of distributed ledgers.

Embodiment B17. The system of Embodiment B15, wherein an existing transaction in a source distributed ledger contains a transaction output whose digitally-represented economic value is to be transferred to a target distributed ledger.

Embodiment B18. The system of Embodiment B17, wherein a locking transaction spends the transaction output of the existing transaction, and wherein verification of the existence of the locking transaction in the source distributed ledger is necessary for a completing transaction in the target distributed ledger to spend a transaction output of an initiating transaction in the target distributed ledger.

Embodiment B19. The system of Embodiment B15, wherein the distributed ledger comprises a blockchain.

Embodiment B20. The system of Embodiment B15, wherein the distributed ledger utilizes a directed acyclic graph.

Embodiment B21. The system of Embodiment B1, wherein the distributed ledger comprises a blockchain.

Embodiment B22. The system of Embodiment B1, wherein the distributed ledger utilizes a directed acyclic graph.

Embodiment B23. The system of Embodiment B8, wherein the distributed ledger comprises a blockchain.

Embodiment B24. The system of Embodiment B8, wherein the distributed ledger utilizes a directed acyclic graph.

Embodiment C1. A computer apparatus for cross-ledger transfers between a plurality of distributed ledgers, the computer apparatus comprising:

memory for holding computer-readable code and data;

one or more processors for executing said computer-readable code so as to modify said data;

computer-readable code for a local node-stack for a target distributed ledger of the plurality of distributed ledgers; and computer-readable code for a foreign payment verification node-stack for a source distributed ledger of the plurality of distributed ledgers, wherein the local node-stack is configured to use the foreign payment verification node-stack to verify transactions in the source distributed ledger during a cross-ledger transfer of a digitally-represented economic value between the target and source distributed ledgers.

Embodiment C2. The computer apparatus of Embodiment C1, further comprising, at the foreign payment verification node-stack:

a block header/signature chain that includes block headers and block signatures for the source distributed ledger.

Embodiment C3. The computer apparatus of Embodiment C2, further comprising, at the foreign payment verification node-stack:

an index of block hashes to the block headers in the block header/signature chain.

Embodiment C4. The computer apparatus of Embodiment C1, wherein an existing transaction in the source distributed ledger contains a transaction output which has the digitally-represented economic value for the cross-ledger transfer.

Embodiment C5. The computer apparatus of Embodiment C4, wherein the local node-stack is configured to construct a locking transaction which spends and locks the digitally-represented economic value of the transaction output of the existing transaction such that the digitally-represented economic value cannot be further spent in the source distributed ledger.

Embodiment C6. The computer apparatus of Embodiment C5, wherein the locking transaction comprises at least one intra-ledger transaction input, one cross-ledger reference transaction input, and zero or more transaction outputs.

Embodiment C7. The computer apparatus of Embodiment C5, wherein the local node-stack is required, prior to constructing a completing transaction which spends a transaction output of an initiating transaction in the target distributed ledger, to verify existence of the locking transaction in the source distributed ledger and match a value of the transaction output of the initiating transaction against the value spent by the locking transaction.

Embodiment C8. The computer apparatus of Embodiment C7, wherein the initiating transaction comprises no transaction inputs and one transaction output.

Embodiment C9. The computer apparatus of Embodiment C7, wherein the completing transaction comprises one intra-ledger transaction input, one cross-ledger reference transaction input, and one or more transaction outputs.

Embodiment C10. A computer apparatus for cross-ledger transfers between a plurality of distributed ledgers, the computer apparatus comprising:
memory for holding computer-readable code and data;
one or more processors for executing said computer-readable code so as to modify said data; and
computer-readable code for node-stacks of the plurality of distributed ledgers,
wherein each said node-stack is configured to perform a cross-ledger transfer of a digitally-represented economic value from a source distributed ledger to a target distributed ledger.

Embodiment C11. The computer apparatus of Embodiment C10, further comprising:
an index of block hashes to block headers for each of the plurality of distributed ledgers.

Embodiment C12. The computer apparatus of Embodiment C10, wherein an existing transaction in the source distributed ledger contains a transaction output whose digitally-represented economic value is to be transferred to the target distributed ledger.

Embodiment C13. The computer apparatus of Embodiment C12, wherein a locking transaction spends and locks the transaction output of the existing transaction.

Embodiment C14. The computer apparatus of Embodiment C13, wherein the locking transaction comprises at least one intra-ledger transaction input, one cross-ledger reference transaction input, and zero or more transaction outputs.

Embodiment C15. The computer apparatus of Embodiment C13, wherein verification of the existence of the locking transaction in the source distributed ledger is necessary for a completing transaction in the target distributed ledger to spend a transaction output of an initiating transaction in the target distributed ledger.

Embodiment C16. The computer apparatus of Embodiment C15, wherein the initiating transaction comprises no transaction inputs and one transaction output.

Embodiment C17. The computer apparatus of Embodiment C15, wherein the completing transaction comprises one intra-ledger transaction input, one cross-ledger reference transaction input, and one or more transaction outputs.

Embodiment C18. An apparatus for cross-ledger transfers between a plurality of distributed ledgers, the apparatus comprising:
means for determining an existing transaction in the source distributed ledger which has a transaction output that is unspent and owned by the entity;
means for constructing and submitting an initiating transaction for commission to the target distributed ledger, wherein the initiating transaction has a transaction output;
means for constructing and submitting a locking transaction for commission to the source distributed ledger, wherein the locking transaction spends and locks the transaction output of the existing transaction in the source distributed ledger and references the initiating transaction in the target distributed ledger; and
means for constructing and submitting a completing transaction for commission to the target distributed ledger, wherein the completing transaction spends the transaction output of the initiating transaction in the target distributed ledger and references the locking transaction in the source distributed ledger.

Embodiment C19. The apparatus of Embodiment C18, wherein the transaction output of the initiating transaction is only spendable by the completing transaction when the completing transaction references the locking transaction and when a value of the transaction output of the initiating transaction matches a value of the transaction output of the existing transaction.

Embodiment C20. The apparatus of Embodiment C18, wherein the distributed ledger comprises a blockchain.

Embodiment C21. The apparatus of Embodiment C18, wherein the distributed ledger utilizes a directed acyclic graph.

Embodiment C22. The computer apparatus of Embodiment C1, wherein the distributed ledger comprises a blockchain.

Embodiment C23. The computer apparatus of Embodiment C1, wherein the distributed ledger utilizes a directed acyclic graph.

Embodiment C24. The computer apparatus of Embodiment C10, wherein the distributed ledger comprises a blockchain.

Embodiment C25. The computer apparatus of Embodiment C10, wherein the distributed ledger utilizes a directed acyclic graph.

CONCLUSION

The presently-disclosed solution uses multiple distributed ledgers and cross-ledger transfers to achieve highly scalable transaction throughput. Disclosed are methods and instruction code for writing a cross-ledger transfer in a way that effectively transfers value from a source to a target blockchain while preventing double spending of the value. Also disclosed are system architectures that utilize cross-ledger transfers between multiple distributed ledgers to achieve highly-scalable transaction throughput. Also disclosed are computer apparatus configured to implement cross-ledger transfers between distributed ledgers.

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method or attaining scalable transactions throughput in a multiple distributed ledger system including a plurality of distributed ledger networks each of which has a plurality of nodes, one of the plurality of distributed ledger networks has a source distributed ledger and another distributed ledger network has a target distributed ledger, the method comprising:
determining an existing transaction in the source distributed ledger which has a transaction output that is unspent, wherein the source distributed ledger is different from the target distributed ledger;

generating and submitting an initiating transaction for commission to the target distributed ledger, wherein the initiating transaction has a transaction output;

generating and submitting a locking transaction for commission to the source distributed ledger locking, by the locking transaction, the transaction output of the existing transaction in the source distributed ledger;

referencing, by the locking transaction, the initiating transaction in the target distributed ledger to verify existence of the initiating transaction;

generating and submitting a completing transaction for commission to the target distributed ledger after referencing the locking transaction in the source distributed ledger to verify existence of the locking transaction, spending, by the completing transaction, the transaction output of the initiating transaction in the target distributed ledger.

2. The method of claim 1, wherein the transaction output of the initiating transaction is only spendable by the completing transaction when the completing transaction references the locking transaction and when a value of the transaction output of the initiating transaction matches a value of the transaction output of the existing transaction.

3. The method of claim 2, wherein the locking transaction uses a Merkle tree reference to reference the initiating transaction.

4. The method of claim 3, wherein the completing transaction uses a Merkle tree reference to reference the locking transaction.

5. The method of claim 1, wherein the method is performed by a node-stack of the source distributed ledger.

6. The method of claim 5, wherein the initiating and completing transactions are submitted to a node-stack of the target distributed ledger, and the node-stack of the target distributed ledger further submits the initiating and completing transactions to the target distributed ledger.

7. The method of claim 1, wherein the method is performed by a node-stack of the target distributed ledger.

8. The method of claim 7, wherein the locking transaction is submitted to a node-stack of the source distributed ledger, and the node-stack of the source distributed ledger further submits the locking transaction to the source distributed ledger.

9. The method of claim 1, wherein the multiple distributed ledger system comprises:
a plurality of distributed ledger networks communicatively connected to each other to perform a cross-ledger transaction, each said distributed ledger network having a plurality of nodes;
wherein a distributed ledger network that maintains a local distributed ledger includes a plurality of foreign payment verification nodes for another distributed ledger in the system to provide verification of the cross-ledger transaction.

10. The method of claim 1, wherein the multiple distributed ledger system comprises:
a plurality of distributed ledger networks communicatively connected to each other to perform a cross-ledger transaction, each said distributed ledger network having a plurality of nodes; and
a set of nodes that are shared by the plurality of distributed ledger networks to provide verification of the cross-ledger transaction.

11. A computer program product comprising one or more computer usable non-transitory media having computer readable program codes embedded therein for operating a multiple distributed ledger system including a plurality of distributed ledger networks each of which has a plurality of nodes, one of the plurality of distributed ledger networks has a source distributed ledger and another distributed ledger network has a target distributed ledger, the computer readable program codes configured to cause the system to execute a cross-ledger transaction process, the process comprising:
determining an existing transaction in a source distributed ledger which has a transaction output that is unspent, wherein the source distributed ledger is different from the target distributed ledger;
generating and submitting an initiating transaction for commission to a target distributed ledger, wherein the initiating transaction has a transaction output;
locking, by the locking transaction, the transaction output of the existing transaction in the source distributed ledger; referencing, by the locking transaction, the initiating transaction in the target distributed ledger to verify existence of the initiating transaction; and
after referencing the locking transaction in the source distributed ledger to verify existence of the locking transaction, spending, by the completing transaction, the transaction output of the initiating transaction in the target distributed ledger.

12. The computer program product of claim 11, wherein the transaction output of the initiating transaction is only spendable by the completing transaction when the completing transaction references the locking transaction and when a value of the transaction output of the initiating transaction matches a value of the transaction output of the existing transaction.

13. The computer program product of claim 12, wherein the locking transaction uses a Merkle tree reference to reference the initiating transaction.

14. The computer program product of claim 13, wherein the completing transaction uses a Merkle tree reference to reference the locking transaction.

15. The computer program product of claim 11, wherein the process is performed by a node-stack of the source distributed ledger.

16. The computer program product of claim 11, wherein the process is performed by a node-stack of the target distributed ledger.

17. The method of claim 1, wherein the unspent transaction output of the existing transaction represents an amount of currency.

* * * * *